US007053902B1

(12) United States Patent
Kurose

(10) Patent No.: US 7,053,902 B1
(45) Date of Patent: May 30, 2006

(54) IMAGE PROCESSING APPARATUS AND METHOD OF PROCESSING IMAGES THAT STOPS OPERATION OF PIXEL PROCESSING CIRCUITS WHEN PIXEL DATA TO BE PROCESSED IS NOT NEEDED

(75) Inventor: Yoshikazu Kurose, Tokyo (JP)

(73) Assignee: Sony Corporation (JP)

( * ) Notice: Subject to any disclaimer, the term of this patent is extended or adjusted under 35 U.S.C. 154(b) by 995 days.

(21) Appl. No.: 09/283,231

(22) Filed: Apr. 1, 1999

(30) Foreign Application Priority Data

Apr. 3, 1998 (JP) ............................ P10-091844
Feb. 26, 1999 (JP) ............................ P11-051795

(51) Int. Cl.
*G06F 15/80* (2006.01)

(52) U.S. Cl. ................................................ 345/505

(58) Field of Classification Search ............... 345/418, 345/419, 422, 426, 441, 428, 423, 501, 502, 345/503, 505, 506, 509, 515, 521, 522, 552, 345/581, 582, 587, 592, 606, 600, 629, 425, 345/430, 431, 433, 435
See application file for complete search history.

(56) References Cited

U.S. PATENT DOCUMENTS 5,179,638 A * 1/1993 Dawson et al. ............. 395/125
5,727,192 A 3/1998 Baldwin ..................... 395/522
5,742,796 A * 4/1998 Huxley ....................... 395/502
5,977,987 A * 11/1999 Duluk, Jr. .................. 345/441

FOREIGN PATENT DOCUMENTS

EP 0 646 873 A2 4/1995
JP 09130570 5/1997

OTHER PUBLICATIONS

Monteiro J. et al.; "Scheduling Techniques to Enable Power Management", Proceeding of the Design Automation Conference (DAC), Us. New York, IEEE, vol. Conf. 33, pp. 349-352 XP000640342ISBN.

* cited by examiner

*Primary Examiner*—Mark Zimmerman
(74) *Attorney, Agent, or Firm*—Rader, Fishman & Grauer, PLLC; Ronald P. Kananen

(57) ABSTRACT

An image processing apparatus which can reduce the power consumption by a large extent, wherein a predetermined shape to be displayed on a display is expressed by a composite of unit graphics by performing operations on a plurality of pixels simultaneously and by performing processing on valid results of operations for pixels positioned inside a unit graphic being processed. Clock enablers in operation sub-blocks judge the validity of the corresponding val data. Only operation sub-blocks receiving the corresponding val data indicating validity perform operations. Other operation sub-blocks do not perform operations. The operation blocks perform pipeline processing.

40 Claims, 12 Drawing Sheets

IMAGE PROCESSING APPARATUS AND METHOD OF PROCESSING IMAGES THAT STOPS OPERATION OF PIXEL PROCESSING CIRCUITS WHEN PIXEL DATA TO BE PROCESSED IS NOT NEEDED

BACKGROUND OF THE INVENTION

1. Field of the Invention

The present invention relates to an image processing apparatus and method which can reduce the power consumption.

2. Description of the Related Art

Computer graphics are often used in a variety of computer aided design (CAD) systems and amusement machines. Especially, along with the recent advances in image processing techniques, systems using three-dimensional computer graphics are becoming rapidly widespread.

In three-dimensional computer graphics, the color value of each pixel is calculated at the time of deciding the color of each corresponding pixel. Then, rendering is performed for writing the calculated value to an address of a display buffer (frame buffer) corresponding to the pixel.

One of the rendering methods is polygon rendering. In this method, a three-dimensional model is expressed as a composite of triangular unit graphics (polygons). By drawing the polygons as units, the colors of the pixels of the display screen are decided.

In polygon rendering, coordinates (x, y, z), color data (R, G, B, α), homogeneous coordinates (s, t) of texture data indicating a composite image pattern, and a value of the homogeneous term q for the respective vertexes of the triangle in a physical coordinate system are input and processing is performed for interpolation of these values inside the triangle.

Here, the homogeneous term q is, simply stated, like an expansion or reduction rate. Coordinates in a UV coordinate system of an actual texture buffer, namely, texture coordinate data (u, v), are comprised of the homogeneous coordinates (s, t) divided by the homogeneous term q to give "s/q" and "t/q" which in turn are multiplied by texture sizes USIZE and VSIZE respectively.

In the three-dimensional computer graphic system, for example, when drawing in the display buffer (frame buffer), the texture data is read from the texture buffer by using the texture coordinate data (u, v) for every pixel and texture mapping is performed for applying the read texture data in units of triangles on the surface of the three-dimensional model.

Note that in texture mapping on a three-dimensional model, the expansion or reduction rate of the image indicated by the texture data to be applied to each pixel changes.

In a three-dimensional computer graphic system, however, there are some cases for example where processing is performed in parallel (simultaneously) for 8 pixels in a predetermined block.

Also, in the above polygon rendering performed in units of triangles, the reduction rate etc. of the texture data to be applied are determined in units of triangles.

Accordingly, in the results of the 8 pixels' worth of operations processed in parallel, the results of operations on the pixels outside the triangle covered become invalid.

Specifically, as shown in FIG. 12, consider the case where a reduction rate is determined by performing a predetermined operation with respect to a triangle 30 and texture mapping is performed by using texture data in accordance with the reduction rate.

Here, the blocks 31, 32, and 33 are regions where 8 (2×4) bits to be processed in parallel are arranged. In polygon rendering, the same texture data is used for the 8 pixels belonging to one block.

In the case shown in FIG. 12, all of the 8 pixels belonging to the block 32 are located inside the triangle 30, so the results of the operations on the 8 pixels are all the valid "1". On the other hand, among the 8 pixels belonging to the blocks 31 and 33, 3 pixels are inside the triangle 30 and 5 pixels are outside the triangle 30. Therefore, the results of the operations on 3 pixels are valid in the 8 pixels, but the results of the operations on the 5 pixels become invalid.

In the related art, the polygon rendering was performed unconditionally on all of the 8 pixels in the blocks.

Summarizing the problem to be solved by the present invention, as explained above, when performing the polygon rendering using triangles as unit graphics, if processing is performed on all of the plurality of pixels located in a block regardless of whether they are inside the triangle covered or not, an enormous number of invalid operations are performed, so there is a large effect on the power consumption.

Also, in a three-dimensional computer graphic system, unnecessary operations are performed due to a variety of reasons in addition to the reason above in some cases.

Further, since the clock frequency for operation of a three-dimensional computer graphic system has been becoming very high recently, reduction of the power consumption has become a significant issue.

SUMMARY OF THE INVENTION

An object of the present invention is to provide an image processing apparatus and method enabling a major reduction in the power consumption To attain the above object, according to a first aspect of the present invention, there is provided an image processing apparatus comprising a plurality of pixel processing circuits, each provided for processing each of a plurality of pixel data to be processed simultaneously, for processing a plurality of input pixel data in parallel and a control circuit for stopping the operation of the pixel processing circuit when the processing of the pixel data to be processed in the processing circuit is not needed.

According to a second aspect of the present invention, there is provided an image processing apparatus for expressing an image to be displayed on a display means by a composite of graphic units of a predetermined shape, processing pixel data of a plurality of pixels positioned within the same graphic unit on the basis of the same processing conditions, and using as valid data the results of the processing of the pixel data of the pixels positioned within the graphic unit to be processed among pixel data of a plurality of pixels to be processed simultaneously, the image processing apparatus comprising a pixel position judging circuit for judging whether or not a corresponding pixel is positioned within the graphic unit for each of the plurality of pixel data to be processed simultaneously; a plurality of pixel processing circuits for processing a plurality of pixel data to be processed simultaneously mutually in parallel; and a control circuit for stopping the operation of the pixel processing circuits other than processing circuits for processing pixel data of pixels positioned within the graphic unit to be processed among the plurality of pixel processing circuits on the basis of the results of the judgement of the pixel position judging circuit.

According to a third aspect of the present invention, there is provided an image processing apparatus comprising a plurality of image processing circuits, provided for a plurality of pixels to be processed simultaneously, for blending a plurality of first pixel data and a corresponding plurality of second pixel data by blending ratios indicated by blending ratio data set for each pixel to produce a plurality of third pixel data and a control circuit for judging whether or not the pixel processing circuits will perform the blending and stopping the operation of the pixel processing circuits when judging that they will not perform the blending.

According to a fourth aspect of the present invention, there is provided an image processing apparatus for expressing an image to be displayed on a display means by a composite of graphic units of a predetermined shape, processing pixel data of a plurality of pixels positioned within the same graphic unit on the basis of the same processing conditions, and using as valid data the results of the processing of the pixel data of the pixels positioned within the graphic unit to be processed among pixel data of a plurality of pixels to be processed simultaneously, the image processing apparatus comprising a plurality of image processing circuits, provided for a plurality of pixels to be processed simultaneously, for blending a plurality of first pixel data and a corresponding plurality of second pixel data by a blending ratio indicated by blending ratio data set for each pixel to produce a plurality of third pixel data and a control circuit for judging whether or not a corresponding pixel is positioned within a graphic unit for each of the plurality of pixels to be processed simultaneously and stopping the operation of a pixel processing circuit when judging that the corresponding pixel is not positioned within the graphic unit or when judging that the blending will not be not performed on the basis of the blending ratio data.

According to a fifth aspect of the present invention, there is provided an image processing apparatus comprising a storage circuit; a plurality of pixel processing circuits, provided for a plurality of pixels to be processed simultaneously, for producing a plurality of second pixel data from a plurality of first pixel data; a comparing circuit for comparing a plurality of first depth data of the plurality of first pixel data and a plurality of second depth data of a plurality of third pixel data stored in the storage circuit in correspondence with the plurality of first depth data; and a control circuit for judging whether or not to rewrite third pixel data corresponding to second depth data stored in the storage circuit by second pixel data and stopping the operation of the corresponding pixel processing circuit when judging not to rewrite.

According to a sixth aspect of the present invention, there is provided an image processing apparatus for expressing an image to be display on a display means by a composite of graphic units of a predetermined shape, processing pixel data of a plurality of pixels positioned within the same graphic unit on the basis of the same processing conditions, and using as valid data the results of the processing of the pixel data of the pixels positioned within the graphic unit to be processed among pixel data of a plurality of pixels to be processed simultaneously, the image processing apparatus comprising a storage circuit; a plurality of pixel processing circuits, provided for a plurality of pixels to be processed simultaneously, for producing a plurality of second pixel data from a plurality of first pixel data; a comparing circuit for comparing a plurality of the first depth data of the plurality of first pixel data and a plurality of second depth data of a plurality of third pixel data stored in the storage circuit in correspondence with the plurality of first depth data; and a control circuit for judging whether or not a corresponding pixel is positioned within the graphic unit for each of the plurality of pixels to be processed simultaneously, judging whether or not to rewrite the third pixel data corresponding to the second depth data stored in the storage circuit with the second pixel data on the basis of the result of the comparison, and stopping the operation of a pixel processing circuit when judging that the corresponding pixel is not positioned within the graphic unit or when judging not to rewrite.

According to a seventh aspect of the present invention, there is provided an image processing method for performing image processing by using pixel processing circuits, each provided for each of a plurality of pixels to be processed simultaneously, for processing a plurality of input pixel data in parallel, comprising the steps of judging whether or not on the basis of the pixel data the pixel processing of the processing circuits is needed, and stopping operation of the pixel processing circuit when judging the pixel processing of the processing of the processing circuit is not needed.

According to an eighth aspect of the present invention, there is provided an image processing method for expressing an image to be displayed on a display means by a composite of graphic units of a predetermined shape, processing pixel data of a plurality of pixels positioned within the same graphic unit on the basis of the same processing conditions, and using as valid data the results of the processing of the pixel data of the pixels positioned within the graphic unit to be processed among pixel data of a plurality of pixels to be processed simultaneously, the image processing method comprising judging whether or not a corresponding pixel is positioned within the graphic unit for each of the plurality of pixel data to be processed simultaneously; processing a plurality of pixel data to be processed simultaneously mutually in parallel in a plurality of pixel processing circuits; and stopping the operation of the pixel processing circuits other than processing circuits for processing pixel data of pixels positioned within the graphic unit to be processed among the plurality of pixel processing circuits on the basis of the results of the judgement.

According to a ninth aspect of the present invention, there is provided an image processing method comprising using a plurality of pixel processing circuits provided for a plurality of pixels to be processed simultaneously to blend a plurality of first pixel data and a plurality of second pixel data by blending ratios indicated by blending ratio data set for each pixel to produce a plurality of third pixel data, judging based on the blending ratio data whether to perform the blending by the pixel processing circuits, and stopping the operation of the corresponding pixel processing circuits when judging that they will not perform the blending.

According to a 10th aspect of the present invention, there is provided an image processing method for expressing an image to be displayed on a display means by a composite of graphic units of a predetermined shape, processing pixel data of a plurality of pixels positioned within the same graphic unit on the basis of the same processing conditions, and using as valid data the results of the processing of the pixel data of the pixels positioned within the graphic unit to be processed among pixel data of a plurality of pixels to be processed simultaneously, the image processing method comprising using a plurality of image processing circuits, provided for a plurality of pixels to be processed simultaneously, to blend a plurality of first pixel data and a plurality of second pixel data by a blending ratio indicated by blending ratio data set for each pixel to produce a plurality of third pixel data and judging whether or not a corresponding pixel is positioned within a graphic unit for each of the plurality of pixels to be processed simultaneously and stopping the operation of a pixel processing circuit when judging that the corresponding pixel is not positioned within the graphic unit or when judging that the blending will not be not performed on the basis of the blending ratio data.

According to an 11th aspect of the present invention, there is provided an image processing method comprising using a plurality of pixel processing circuits, provided for a plurality of pixels to be processed simultaneously, to produce a plurality of second pixel data from a plurality of first pixel data; comparing a plurality of first depth data of the plurality of first pixel data and a plurality of second depth data of a plurality of third pixel data stored in a storage circuit in correspondence with the plurality of first depth data; and judging whether or not to rewrite third pixel data corresponding to second depth data stored in the storage circuit by second pixel data and stopping the operation of the corresponding pixel processing circuit when judging not to rewrite.

According to a 12th aspect of the present invention, there is provided an image processing method for expressing an image to be display on a display means by a composite of graphic units of a predetermined shape, processing pixel data of a plurality of pixels positioned within the same graphic unit on the basis of the same processing conditions, and using as valid data the results of the processing of the pixel data of the pixels positioned within the graphic unit to be processed among pixel data of a plurality of pixels to be processed simultaneously, the image processing method comprising using a plurality of pixel processing circuits, provided for a plurality of pixels to be processed simultaneously, to produce a plurality of second pixel data from a plurality of first pixel data; comparing a plurality of the first depth data of the plurality of first pixel data and a plurality of second depth data of a plurality of third pixel data stored in a storage circuit in correspondence with the plurality of first depth data; and judging whether or not a corresponding pixel is positioned within the graphic unit for each of the plurality of pixels to be processed simultaneously, judging whether or not to rewrite the third pixel data corresponding to the second depth data stored in the storage circuit with the second pixel data on the basis of the result of the comparison, and stopping the operation of a pixel processing circuit when judging that the corresponding pixel is not positioned within the graphic unit or when judging not to rewrite.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, preferred embodiments will be described with reference to the accompanying drawings.

The explanation will be made of a three-dimensional computer graphic system for displaying in a high speed a desired three-dimensional image of any three-dimensional object model on a display, such as a cathode ray tube (CRT), which is applied to home game machines, etc.

First Embodiment

Figure 1:
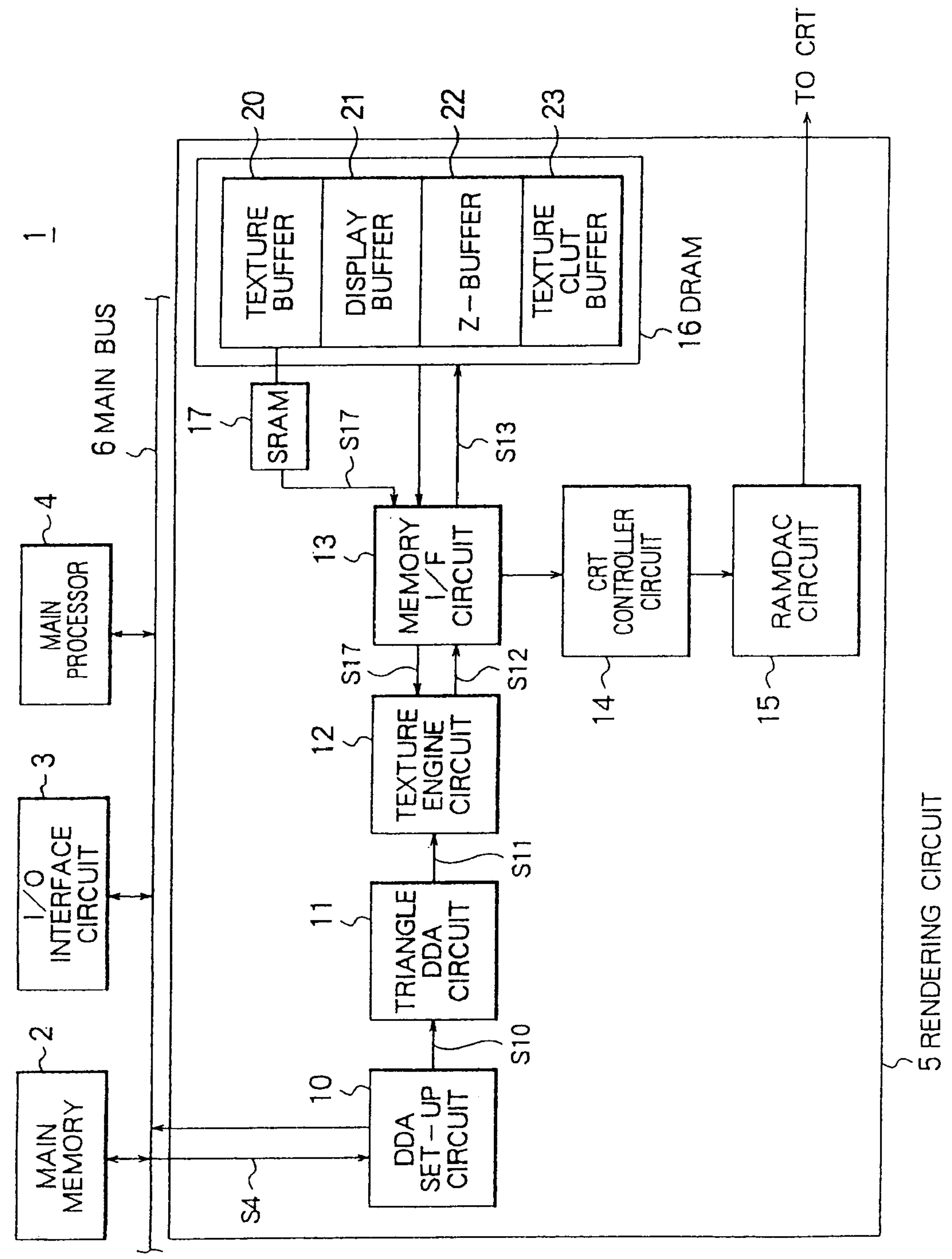
FIG. 1 is a view of the system configuration of a three-dimensional computer graphic system according to a first embodiment of the present invention.

FIG. 1 is a view of the system configuration of a three-dimensional computer graphic system 1 according to the first embodiment.

In the three-dimensional computer graphic system 1, a three-dimensional model is expressed by a composite of triangular unit graphics (polygons). By drawing the polygons, this system can decide the color of each pixel on the display screen and perform polygon rendering for display on the screen.

In the three-dimensional computer graphic system 1, a three-dimensional object is expressed by using a z-coordinate for indicating the depth in addition to the (x, y) coordinates for indicating positions on a two-dimensional plane. Any one point of the three dimensional space can be expressed by the three coordinates (x, y, z).

As shown in FIG. 1, in the three-dimensional computer graphic system 1, a main memory 2, an I/O interface circuit 3, a main processor 4, and a rendering circuit 5 are connected via a main bus 6.

Below, the operations of the respective components will be explained.

The main processor 4, for example, in accordance with the state of progress in a game, reads the necessary graphic data from the main memory 2, performs clipping, lighting, geometrical processing, etc. on the graphic data and generates polygon rendering data. The main processor 4 outputs the polygon rendering data S4 to the rendering circuit 5 via the main bus 6.

The I/O interface 3 receives as input the polygon rendering data from the outside in accordance with need and outputs the same to the rendering circuit via the main bus 6.

Here, the polygon rendering data includes data of each of the three vertexes (x, y, z, R, G, B, α, s, t, q) of the polygon.

The (x, y, z) data indicates the three-dimensional coordinates of a vertex of the polygon, and the (R, G. B) data indicates the luminance values of red, green, and blue at the three-dimensional coordinates, respectively.

The data α indicates a coefficient of blending the R, G, B data of a pixel to be drawn and that of a pixel already stored in the display buffer 21.

Among the (s, t, q) data, the (s, t) indicates homogeneous coordinates of a corresponding texture and the q indicates the homogenous term. Here, the texture sizes USIZE and VSIZE are respectively multiplied with the "s/q" and "t/q" to obtain coordinate data (u, v) of the texture. The texture coordinate data (u, v) is used for accessing the texture data stored in the texture buffer 20.

Namely, the polygon rendering data indicates physical coordinate values of the vertexes of a triangle and values of colors of the vertexes, texture, and fogging.

The rendering circuit 5 will be explained in detail below.

As shown in FIG. 1, the rendering circuit 5 comprises a digital differential analyzer (DDA) set-up circuit 10, a triangle DDA circuit 11, a texture engine circuit 12, a memory interface (I/F) circuit 13, a cathode ray tube (CRT) controller circuit 14, a random access memory (RAM) DAC circuit 15, a dynamic random access memory (DRAM) 16, and a static random access memory (SRAM) 17.

The DRAM 16 functions as a texture buffer 20, a display buffer 21, a z-buffer 22, and a texture CLUT buffer 23.

DDA Set-Up Circuit 10

The DDA set-up circuit 10 performs linear interpolation of the values of the vertexes of the triangle on the physical coordinates in a triangle DDA circuit 11 in its latter part. The DDA set-up circuit 10, prior to obtaining information of the color and depth of the respective pixels inside the triangle, performs a set-up operation for obtaining the sides of the triangle and the difference in a horizontal direction for the data (z, R, G, B, α, s, t, q) indicated by the polygon rendering data S4.

Specifically, this set-up operation uses values of the starting point and the ending point and the distance between the two points to calculate the variation of the value to find when moving by a unit length.

Also, the DDA set-up circuit 10 determines the 1-bit validity instruction data val indicating for each of the 8 bits simultaneously being processed whether it is inside the triangle in question or not. Specifically, the validity instruction data val is "1" for a pixel inside the triangle and "0" for a pixel outside the triangle.

The DDA set-up circuit 10 outputs the calculated variational data S10 and the validity instruction data val of the respective pixels to the triangle DDA circuit 11.

Triangle DDA Circuit 11

The triangle DDA circuit 11 uses the variational data input from the DDA set-up circuit 10 to calculate the linearly interpolated (z, R, G, B, α, s, t, q) data of the pixels inside the triangle.

The triangle DDA circuit 11 outputs the data (x, y) for each pixel and the (z, R, G, B, α, s, t, q, val) data for the pixels at the (x, y) coordinates to the texture engine circuit 12 as DDA data (interpolation data) S11.

In the first embodiment, the triangle DDA circuit 11 outputs the DDA data S11 of 8 (=2×4) pixels positioned inside a block being processed in parallel to the texture engine circuit 12.

Figure 2:
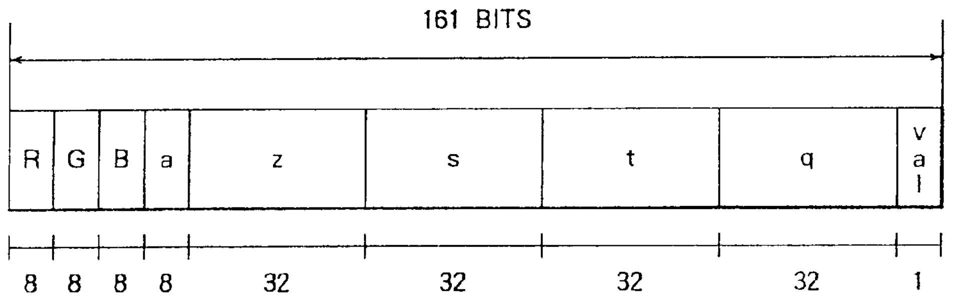
FIG. 2 is a view for explaining a format of DDA data output from a triangle DDA circuit in FIG. 1.

Here, the (z, R, G, B, α, s, t, q) data of the DDA data S11 comprises 161 bits of data as shown in FIG. 2.

Specifically, each of the R, G, B, and α data comprises 8 bits, each of the Z, s, t, and q data comprises 32 bits, and the val data comprises one bit.

Note that among the (z, R, G, B, α, s, t, q, val) data of the 8 bits being processed in parallel, the val data is referred to as val data $\mathbf{S220}_1$ to $\mathbf{S220}_8$ and the (z, R, G, B, α, s, t, q, val) data are referred to as operation data $\mathbf{S221}_1$ to $\mathbf{S221}_8$.

Namely, the triangle DDA circuit 11 outputs the DDA data S11 composed of (x, y) data, val data $\mathbf{S220}_1$ to $\mathbf{S220}_8$, and the operation data $\mathbf{S221}_1$ to $\mathbf{S221}_8$ for 8 pixels to the texture engine circuit 12.

Texture Engine Circuit 12 and Memory I/F Circuit 13

Figure 3:
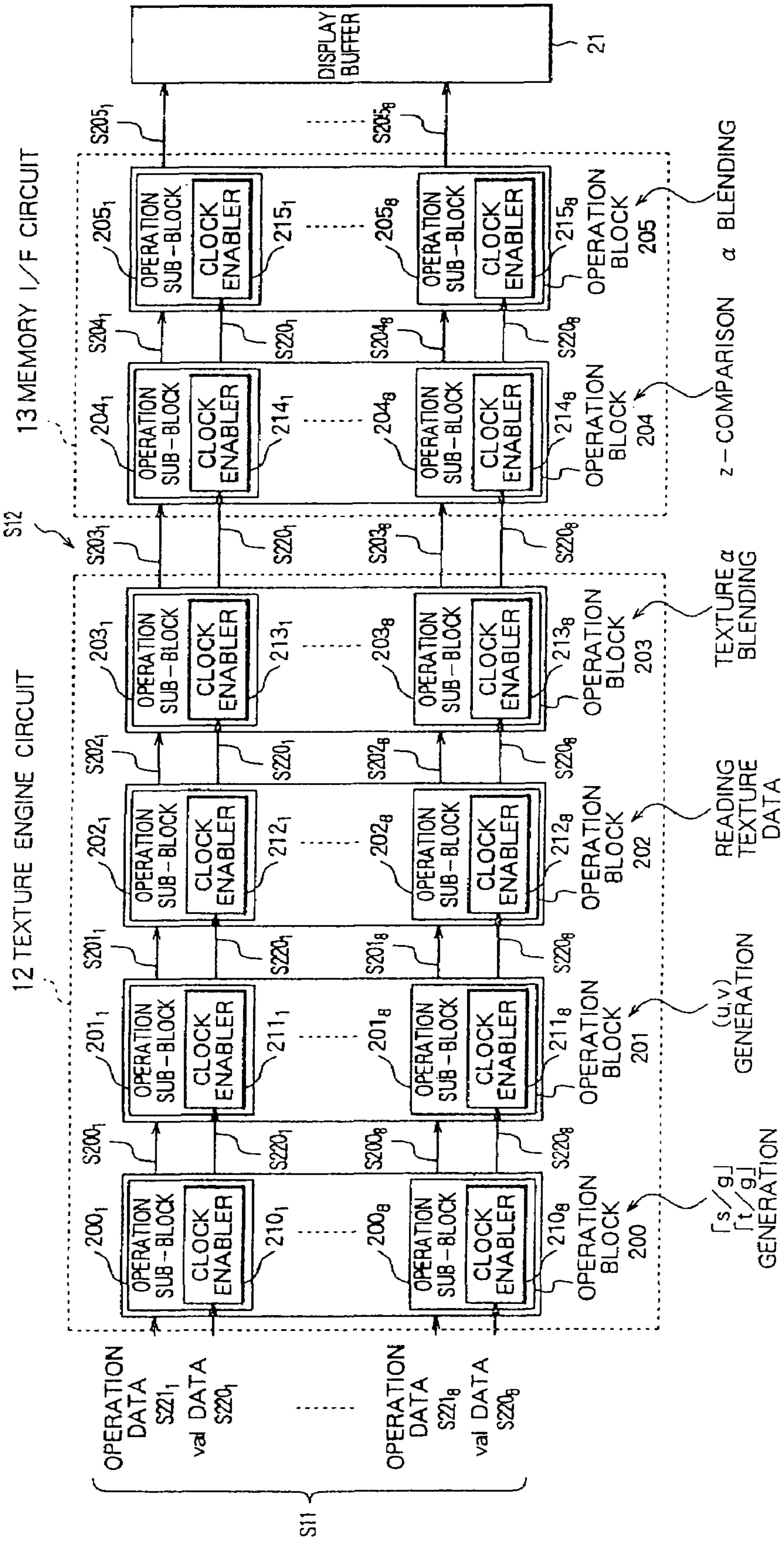
FIG. 3 is a partial view of the configuration of a texture engine circuit and a memory I/F circuit shown in FIG. 1.

The calculation of "s/q" and "t/q" by the texture engine circuit 12 using the DDA data S11, its calculation of the texture coordinate data (u, v), and its reading of the data (R, G, B, α) from the texture buffer 20 and the z-comparison and blending by the memory I/F circuit 13 are performed successively by a pipeline system in the operation blocks 200, 201, 202, 203, 204, and 205 shown in FIG. 3.

Here, the operation blocks 200, 201, 202, 203, 204, and 205 respectively include eight operation sub-blocks and perform operations on 8 bits in parallel.

Here, the texture engine circuit 12 includes the operation blocks 200, 201, 202, and 203, while the memory I/F circuit 13 includes the operation blocks 204 and 205.

[Operation Block 200]

The operation block 200 uses the (s, t, q) data included in the DDA data S11 to perform the operation of dividing the s data by the q data and the operation of dividing the t data by the q data.

The operation block 200 includes eight operation sub-blocks $\mathbf{200}_1$ to $\mathbf{200}_8$ as shown in FIG. 3.

Here, the operation sub-block $\mathbf{200}_1$ receives as input the operation data $\mathbf{S221}_1$ and the val data $\mathbf{S220}_1$. When the val data $\mathbf{S220}_1$ is "1", that is, indicates the data is valid, it calculates "s/q" and "t/q" and outputs the result of the calculation as the result of division $\mathbf{S200}_1$ to the operation sub-block $\mathbf{201}_1$ of the operation block 201.

When the val data $\mathbf{S220}_1$ is "0", that is, indicates the data is invalid, the operation sub-block $\mathbf{200}_1$ does not perform the operations and does not output the result of division $\mathbf{S200}_1$ or outputs a result of division $\mathbf{S200}_1$ indicating a predetermined provisional value to the operation sub-block $\mathbf{201}_1$ of the operation block 201.

Also, the operation sub-block $\mathbf{200}_1$ outputs the val data $\mathbf{S220}_1$ to the later operation sub-block $\mathbf{201}_1$.

Note that the operation sub-blocks $\mathbf{200}_2$ to $\mathbf{200}_8$ respectively perform the same operations as the operation sub-block $\mathbf{200}_1$ on the corresponding pixels and output the respective results of division $\mathbf{S200}_2$ to $\mathbf{S200}_8$ and the val data $\mathbf{S220}_2$ to $\mathbf{S220}_8$ to the operation sub-blocks $\mathbf{201}_2$ to $\mathbf{201}_8$ in the later operation block 201.

Figure 4:
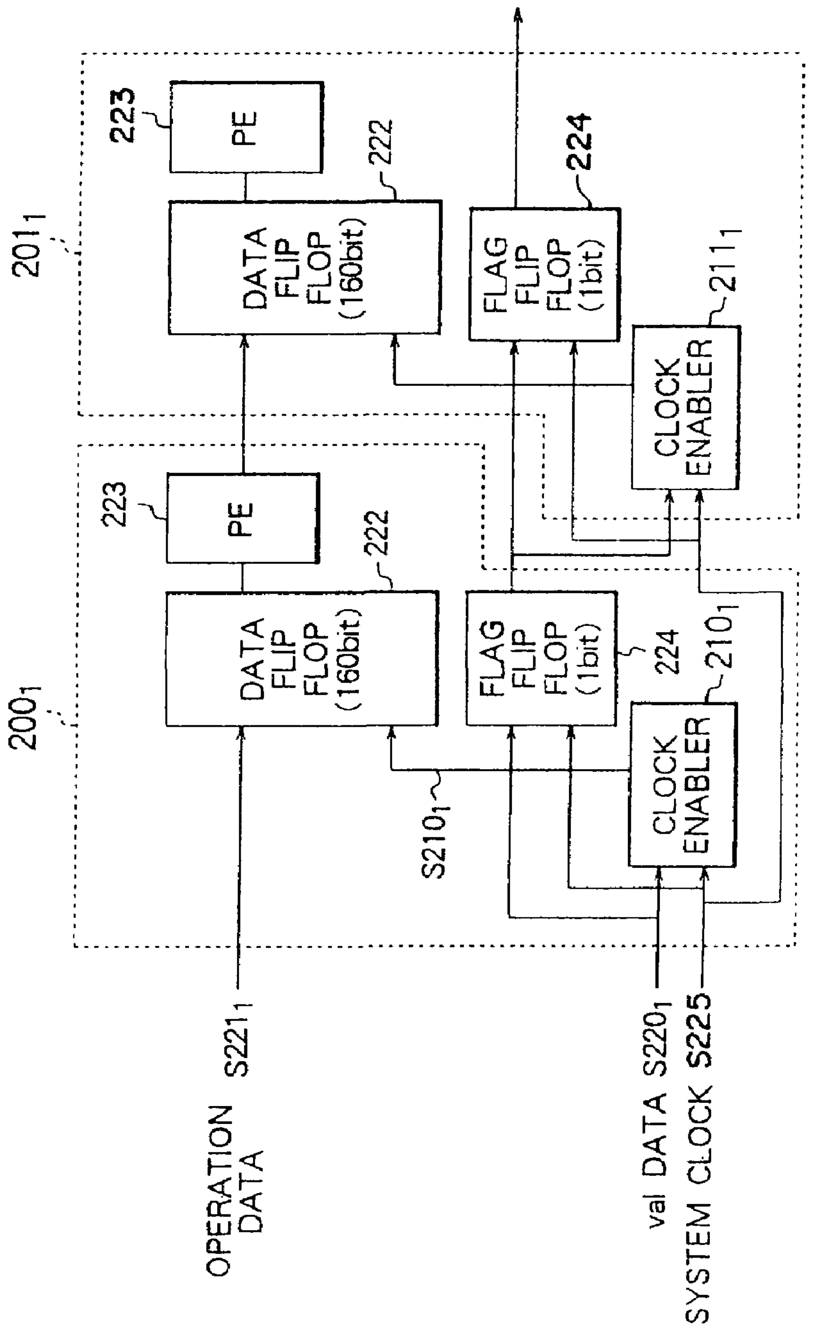
FIG. 4 is a view of the configuration inside an operation sub-block shown in FIG. 3.

FIG. 4 is a view of the configuration of the inside of the operation sub-block $\mathbf{200}_1$.

Note that all of the operation sub-blocks shown in FIG. 3 basically have the configuration shown in FIG. 4.

As shown in FIG. 4, the operation sub-block $\mathbf{200}_1$ comprises a clock enabler $\mathbf{210}_1$, a data flip-flop 222, a processor element 223, and a flag flip-flop 224.

The clock enabler $\mathbf{210}_1$ receives as input the val data $\mathbf{S220}_1$ at timings based on the system clock signal S225 and detects the level of the val data $\mathbf{S220}_1$. When the val data $\mathbf{S220}_1$ is "1", the clock enabler $\mathbf{210}_1$, for example, makes the clock signal $\mathbf{S210}_1$ pulse, while when "0", does not make the clock signal $\mathbf{S210}_1$ pulse.

The data flip-flop 222, when detecting a pulse of the clock signal $\mathbf{S210}_1$, fetches the operation data $\mathbf{S221}_1$ and outputs it to the processor element 223.

The processor element 223 uses the input operation data S221$_1$ to perform the above-mentioned division and outputs the result of division S200$_1$ to the data flip-flop 222 of the operation sub-block 201$_1$.

The flag flip-flop 224 receives the val data S220$_1$ at timings based on the system clock signal S225 and outputs it to the flag flip-flop 224 of the operation sub-block 201$_1$ of the later operation block 201.

Note that the system clock signal S225 is supplied to the clock enablers and the flag flip-flops 224 of all of the operation sub-blocks 200$_1$ to 200$_8$, 201$_1$ to 201$_8$, 202$_1$ to 202$_8$, and 204$_1$ to 204$_8$ shown in FIG. 3.

Namely, the processing in the operation sub-blocks 200$_1$ to 200$_8$, 201$_1$ to 201$_8$, 202$_1$ to 202$_8$, and 204$_1$ to 204$_8$ are carried out synchronously and the eight operation sub-blocks built in the same operation block perform the processing in parallel.

[Operation Block 201]

The operation block 201 has the operation sub-blocks 201$_1$ to 201$_8$ and multiplies texture sizes USIZE and VSIZE respectively with "s/q" and "t/q" indicated by the results of division S200$_1$ to S200$_8$ input from the operation block 200 to generate the texture coordinate data (u, v).

The operation sub-blocks 201$_1$ to 201$_8$ perform operations only when the results of the level detection of the val data S220$_1$ to S220$_8$ by the clock enablers 211$_1$ to 211$_8$ are "1" and output the texture coordinate data S201$_1$ to S201$_8$ as the results of the operations to the operation sub-blocks 202$_1$ to 202$_8$ of the operation block 202.

[Operation Block 202]

The operation block 202 has the operation sub-blocks 202$_1$ to 202$_8$, outputs a reading request including the texture coordinate data (u, v) generated in the operation block 201 to the SRAM 17 or DRAM 16 via the memory I/F circuit 13, and reads the texture data stored in the SRAM 17 or the texture buffer 20 via the memory I/F circuit 13 to obtain the data S17 (R. G, B, α) stored at the texture address corresponding to the (u, v) data.

Note that the texture buffer 20 stores MIPMAP (textures of a plurality of resolutions) and other texture data corresponding to a plurality of reducing rates. Here, which reducing rate of texture data to use is determined in units of the above triangles using a predetermined algorithm.

The SRAM 17 stores a copy of the texture data stored in the texture buffer 20.

The operation sub-blocks 202$_1$ to 202$_8$ perform the reading only when the results of the level detection of the val data S220$_1$ to S220$_8$ by the clock enablers 212$_1$ to 212$_8$ are "1" and output the read (R, G, B, α) data S17 as the (R, G, B, α) data S202$_1$ to S202$_8$ to the operation sub-blocks 203$_1$ to 203$_8$ of the operation block 203.

In the case of a full color mode, the texture engine circuit 12 directly uses the (R, G, B, α) data read from the texture buffer 20. In the case of an index color mode, the texture engine circuit 12 reads a color look-up table (CLUT), prepared in advance, from the texture CLUT buffer 23, transfers and stores the same in the built-in SRAM, and uses the color look-up table to obtain the (R, G, B) data corresponding to the color index read from the texture buffer 20.

[Operation Block 203]

The operation block 203 has the operation sub-blocks 203$_1$ to 203$_8$ and blends the texture data (R, G, B α) S202$_1$ to S202$_8$ input from the operation block 202 and the (R, G, B) data included in the DDA data S11 from the triangle DDA circuit 11 by the blending ratio indicated in the α data (texture α) included in the (R, G, B, α) data S202$_1$ to S202$_8$ to generate (R, G, B) blended data.

Then, the operation block 203 outputs the generated (R, G, B) blended data and the (R, G, B, α) data S203$_1$ to 203$_8$ including the a data included in the corresponding DDA data S11 to the operation block 204.

The operation sub-blocks 203$_1$ to 203$_8$ perform the above blending and output the (R, G, B, α) data S203$_1$ to S203$_8$ only when results of the level detection of the val data S220$_1$ to S220$_8$ by the clock enablers 213$_1$ to 213$_8$ are "1."

[Operation Block 204]

The operation block 204 has the operation sub-blocks 204$_1$ to 204$_8$ and performs a z-comparison for the input (R, G, B, α) data S203$_1$ to S203$_8$ by using the content of the z-data stored in the z-buffer 22. When the image drawn by the (R, G, B, α) data S203$_1$ to S203$_8$ is positioned closer to the viewing point than the image drawn in the display buffer 21 the previous time, the operation block 204 updates the z-buffer 22 and outputs the (R, G, B, α) data S203$_1$ to S203$_8$ as the (R, G, B, α) data S204$_1$ to S204$_8$ to the operation sub-blocks 205$_1$ to 205$_8$ of the operation block 205.

The operation sub-blocks 204$_1$ to 204$_8$ perform the above z-comparison and output the (R, G, B, α) of the data S204$_1$ to S204$_8$ only when the results of the level detection of the val data S220$_1$ to S220$_8$ by the clock enablers 214$_1$ to 214$_8$ are "1".

[Operation Block 205]

The operation block 205 has the operation sub-blocks 205$_1$ to 205$_8$, blends the (R, G, B, α) of the data S204$_1$ to S204$_8$ and the (R, G, B) data already stored in the display buffer 21 by the blending ratio indicated in the α data included in the (R, G, B, α) data S204$_1$ to S204$_8$, and writes the blended (R, G, B) data S205$_1$ to S205$_8$ in the display buffer.

Note that the DRAM 16 is accessed by the memory I/F circuit 13 simultaneously for 16 pixels.

The operation sub-blocks 205$_1$ to 205$_8$ perform the above blending and writing to the display buffer 21 only when the results of the level detection of the val data S220$_1$ to S220$_8$ by the clock enablers 215, to 2158 are "1".

CRT Controller Circuit 14

The CRT controller circuit 14 generates an address for display on a not shown CRT in synchronization with the given horizontal and vertical synchronization signals and outputs a request for reading the display data from the display buffer 21 to the memory I/F circuit 13. In response to this request, the memory I/F circuit 13 reads a certain amount of the display data from the display buffer 21. The CRT controller 14 has a built-in first-in-first-out (FIFO) circuit for storing the display data read from the display buffer 21 and outputs the index value of RGB to the RAMDAC circuit 15 at certain time intervals.

RAMDAC Circuit 15

The RAMDAC circuit 15 stores the R, G, B data corresponding to the respective index values, transfers the digital R, G, B data corresponding to the index value of RGB input from the CRT controller 14, and generates the analog RGB data. The RAMDAC circuit 15 outputs the generated R, G, B data to the CRT.

The operation of the entire three-dimensional computer graphic system 1 will be explained below.

Polygon rendering data S4 is output from the main processor 4 to the DDA set-up circuit 10 via the main bus 6. Variational data S10 indicating the sides of the triangle and the difference in a horizontal direction etc. is generated in the DDA set-up circuit 10.

This variational data S10 is output to the triangle DDA circuit 11. In the triangle DDA circuit 11, the linearly interpolated data (z, R, G, B, α, s, t, q) for each pixel inside the triangle is calculated. Then, the calculated (z, R, G, B, α, s, t, q) data and the (x, y) data of the vertexes of the triangle are output from the triangle DDA circuit 11 to the texture engine circuit 12 as DDA data S11.

Next, the texture engine circuit 12 and memory I/F circuit 13 use the DDA data S11 to calculate "s/q" and "t/q", calculate the texture coordinate data (u, v), read the (R, G, B, α) data as digital data from the texture buffer 20, blend it, and write the result to the display buffer 21 successively in the operation blocks 200, 201, 202, 203, 204, and 205 shown in FIG. 3 in a pipeline format.

The operation of the pipeline processing of the texture engine circuit 12 and the memory I/F circuit 13 shown in FIG. 3 will be explained below.

Figure 12:
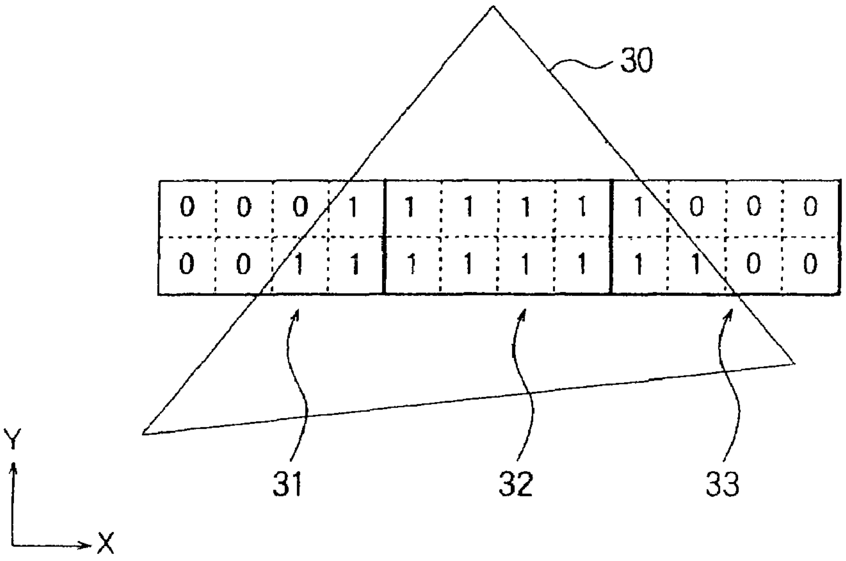
FIG. 12 is a view for explaining disadvantages of the related art.

Here, a case of, for example, simultaneous processing on 8 pixels in a block 31 shown in FIG. 12 will be considered. In this case, the val data $S220_1$, $S220_2$, $S220_3$, $S220_5$, and $S220_6$ indicate "0" and the val data $S220_4$, $S220_7$, and $S220_8$ indicate "1."

The val data $S220_1$ to $S220_8$ and the operation data $S221_1$ to $S221_8$ are input to the corresponding clock enablers $210_1$ to $210_8$ of the operation sub-blocks $200_1$ to $200_8$.

Then in the clock enablers $210_1$ to $210_8$, the levels of the respective val data $S220_1$ to $S220_8$ are detected. Specifically, "1" is detected in the clock enablers $210_4$, $210_7$, and $210_8$ and "0" is detected in the clock enablers $210_1$, $210_2$, $210_3$, $210_5$, and $210_6$.

As a result, "s/q" and "t/q" are calculated by using the operation data $S221_4$, $S221_7$, and $S221_8$ only in the operation sub-blocks $200_4$, $200_7$, and $200_8$. The results of the division $S200_4$, $S200_7$, and $S200_8$ are output to the operation sub-blocks $201_4$, $201_7$, and $201_8$ of the operation block 201.

On the other hand, division is not performed in the operation sub-blocks $200_1$, $200_2$, $200_3$, $200_5$, and $200_6$.

Further, in synchronization with the output of the results of the division $S200_4$, $S200_7$, and $S200_8$, the val data $S220_1$ to $S220_8$ are output to the operation sub-blocks $201_1$ to $201_8$ of the operation block 201.

Next, the clock enablers $211_1$ to $211_8$ of the operation sub-blocks $201_1$ to $201_8$ detect the levels of the respective val data $S220_1$ to $S220_8$.

Based on the detection results, only the operation sub-blocks $201_4$, $201_7$, and $201_8$ multiply the texture sizes USIZE and VSIZE with the "s/q" and "t/q" indicated by the results of the division $S200_4$, $S200_7$, and $S200_8$ to generate the texture coordinate data $S202_4$, $S202_7$, and $S202_8$ and output the same to the operation sub-blocks $202_4$, $202_7$, and $202_8$ of the operation block 202.

On the other hand, no operation is performed in the operation sub-blocks $201_1$, $201_2$, $201_3$, $201_5$, and $201_6$.

In synchronization with the output of the texture coordinate data $S202_4$, $S202_7$, and $S202_8$, the val data $S220_1$ to $S220_8$ are output to the operation sub-blocks $202_1$ to $202_8$ of the operation block 202.

Next, the clock enablers $212_1$ to $212_8$ of the operation sub-blocks $202_1$ to $202_8$ detect the levels of the respective val data $S220_1$ to $S220_8$.

Then, based on the detection results, only the operation sub-blocks $202_4$, $202_7$, and $202_8$ read the texture data stored in the SRAM 17 or the texture buffer 20 and read the (R, G, B, α) data stored at the texture addresses corresponding to the (s, t) data.

The read (R, G, B, α) data $S202_4$, $S202_7$, and $S202_8$ are output to the operation sub-blocks $203_4$, $203_7$, and $203_8$ of the operation block 203.

No read operation is performed in the operation sub-blocks $202_1$, $202_2$, $202_3$, $202_5$, and $202_6$.

In synchronization with the output of the (R, G, B, α) data $S202_4$, $S202_7$, and $S202_8$, the val data $S220_1$ to $S220_8$ are output to the sub-blocks $203_1$ to $203_8$ of the operation block 203.

Next, the clock enablers $213_1$ to $213_8$ of the operation sub-blocks $203_1$ to $203_8$ detect the levels of the respective val data $S220_1$ to $S220_8$.

Then, based on the detection results, only the operation sub-blocks $203_4$, $203_7$, and $203_8$ blend the texture data (R, G, B, α) $S202_4$, $S202_7$, and $S202_8$ input from the operation block 202 and the (R, G, B) data included in the DDA data S11 from the triangle DDA circuit 11 by the blending ratio indicated by the α data (texture α) included in the (R, G, B, α) data $S202_4$, $S202_7$, and $S202_8$ to generate the blended data (R, G, B).

Then, the operation sub-blocks $203_4$, $203_7$, and $203_8$ output the generated blended data (R, G, B) and the (R, G, B, α) data $S203_4$, $S203_7$, and $S203_8$ including the a data included in the corresponding DDA data S11 to the operation block 204.

On the other hand, no blending is performed in the operation sub-blocks $203_1$, $203_2$, $203_3$, $203_5$, and $203_6$.

Next, the clock enablers $214_1$ to $214_8$ of the operation sub-blocks $204_1$ to $204_8$ detect the levels of the respective val data $S220_1$ to $S220_8$.

Based on the detection results, only the operation sub-blocks $204_4$, $204_7$, and $204_8$ perform the z-comparison. When the image drawn by the (R, G, B, α) data $S203_4$, $S203_7$, and $S203_8$ is positioned closer to the viewing point than the image drawn in the display buffer 21 the previous time, the z-buffer 22 is updated and the (R, G, B, α) data $S203_4$ $S203_7$, and $S203_8$ is output as the (R, G, B, α) data $S204_4$, $S204_7$, and $S204_8$ to the operation sub-blocks $205_4$, $205_7$, and $205_8$ of the operation block 205.

Next, the clock enablers $215_1$ to $215_8$ of the operation sub-blocks $205_1$ to $205_8$ detect the levels of the respective val data $S220_1$ to $S220_8$.

Based on the detection results, the (R, G, B) data in the (R, G, B, α) data $S204_4$, $S204_7$, and $S204_8$ and the (R, G, B) data already stored in the display buffer 21 are blended by the blending ratio indicated by the α data. Then, the blended (R, G, B) data $S205_4$, $S205_7$, and $S205_8$ are finally calculated.

Then, the (R, G, B) data $S205_4$, $S205_7$, and $S205_8$ are written in the display buffer 21.

No blending is performed in the operation sub-blocks $204_1$, $204_2$, $204_3$, $204_5$, and $205_6$.

Figure 6:
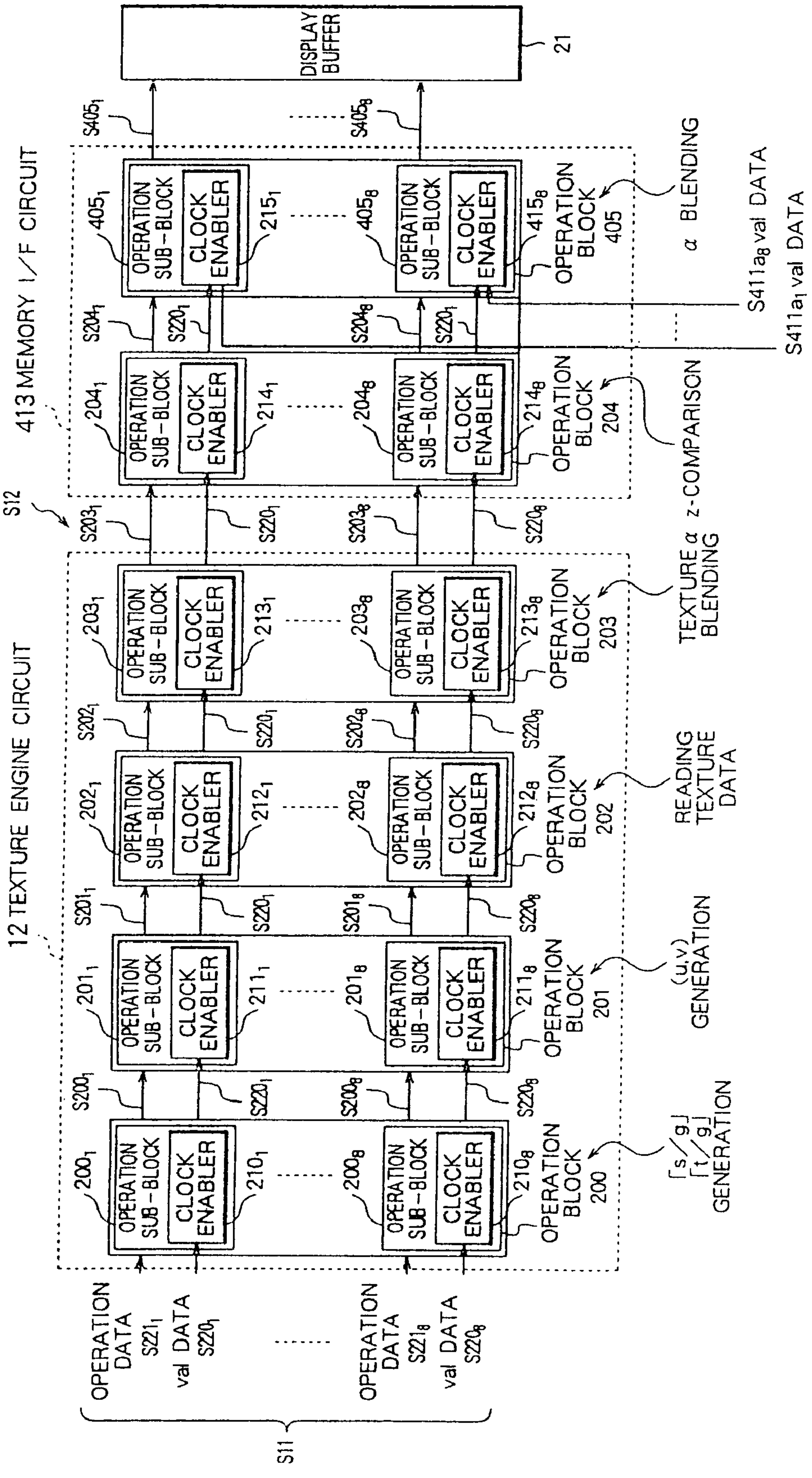
FIG. 6 is a partial view of the configuration of a texture engine circuit and a memory I/F circuit shown in FIG. 5.

The texture engine circuit 12 and the memory I/F circuit 13 do not perform processing on the pixels outside the triangle 30 when simultaneously performing the processing on the pixels inside the block 31 shown in FIG. 6. That is, during the processing on the pixels inside the block 31, the operation sub-blocks $200_1$, $200_2$, $200_3$, $200_5$, $200_6$, $201_1$, $201_2$, $201_3$, $201_5$, $201_6$, $202_1$, $202_2$, $202_3$, $202_5$, $202_6$, $204_1$, $204_2$, $204_3$, $204_5$, $204_6$, $205_1$, $205_2$, $205_3$, $205_5$, and $205_6$ are stopped, therefore these operation sub-blocks do not consume any power.

As explained above, according to this three-dimensional computer graphic system 1, it is possible not to perform any operation on the pixels outside a triangle being processed among the 8 pixels being simultaneously processed in the pipeline processing in the texture engine circuit 12.

Therefore, the power consumption in the texture engine circuit 12 can be reduced by a large extent. As a result, a simple and inexpensive power source can be used for the three-dimensional computer graphic system 1.

Note that the texture engine circuit 12 realizes the above functions by installing the clock enabler and a 1-bit flag flip-flop in each operation sub-block, as shown in FIGS. 3 and 4. However, since the sizes of the circuit of the clock enabler and the 1-bit flag flip-flop are small, the size of the texture engine circuit 12 is not increased much.

Second Embodiment

Figure 5:
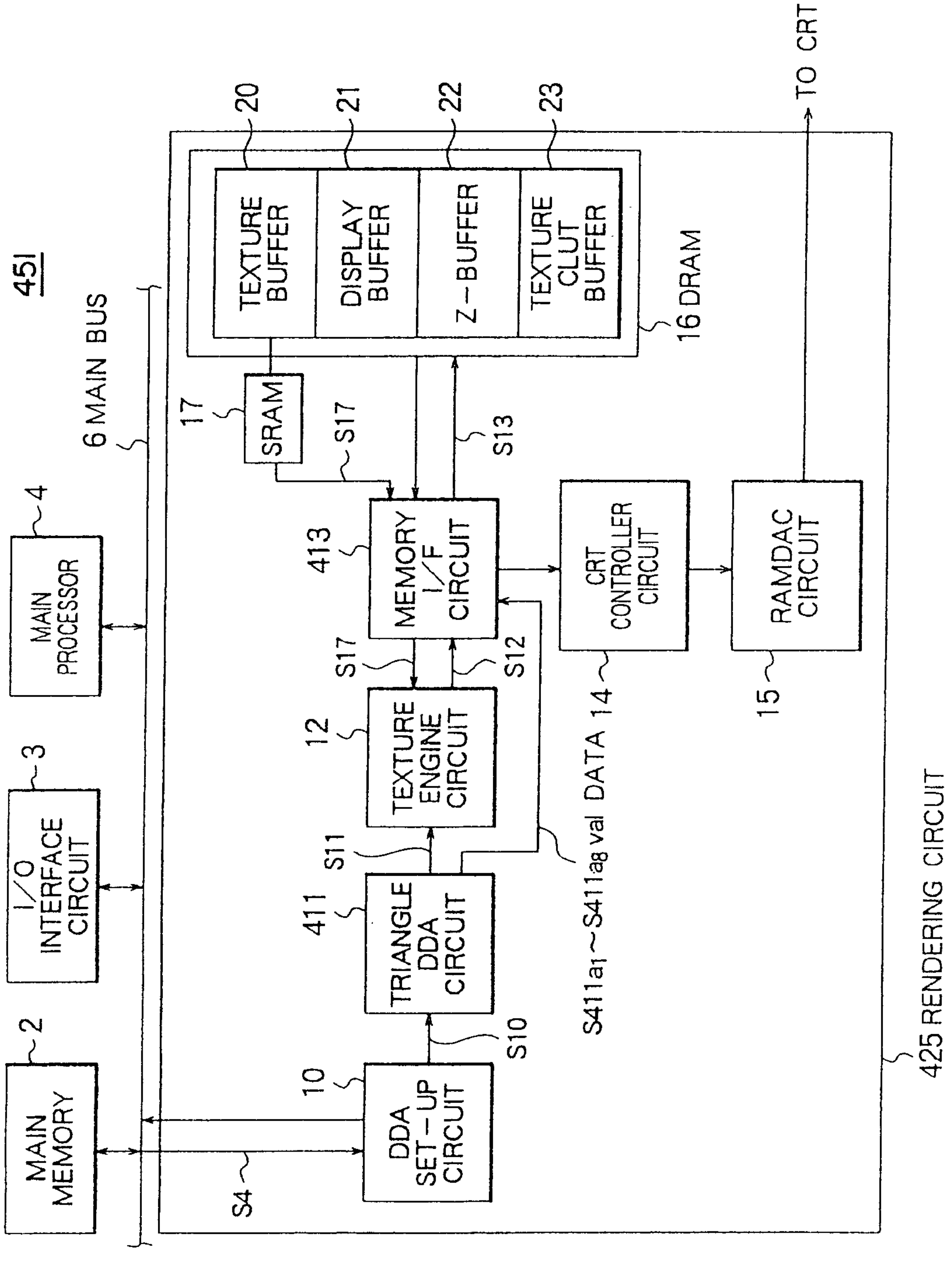
FIG. 5 is a view of the system configuration of a three-dimensional computer graphic system according to a second embodiment of the present invention.

FIG. 5 is a view of the system configuration of a three-dimensional computer graphic system 451 of the second embodiment.

The three-dimensional computer graphic system 451 is the same as the above three-dimensional computer graphic system 1 except that it judges whether or not to perform the α blending for each of the pixels in advance and that it stops the processing in the corresponding operation sub-blocks among the operation sub-blocks which perform the α blending when judged not to perform the α blending.

Namely, in the second embodiment, the respective operation sub-blocks stop processing when the corresponding pixel is outside the triangle being processed in the same way as in the first embodiment. Also, the operation sub-block for performing the α blending among the operation sub-blocks stops processing when the corresponding pixel is outside the triangle being processed or the α data of the corresponding pixel is "0".

As shown in FIG. 5, the three-dimensional computer graphic system 451 comprises a main memory 2, an I/O interface circuit 3, a main processor 4, and a rendering circuit 425 connected via a main bus 6.

Components in FIG. 5 given the same reference numerals as in FIG. 1 are the same as the components given the same reference numerals explained in the first embodiment.

Namely, the main memory 2, the I/O interface circuit 3, the main processor 4, and the main bus 6 are the same as those explained in the first embodiment.

Also, as shown in FIG. 5, the rendering circuit 425 comprises a DDA set-up circuit 10, a triangle DDA circuit 411, a texture engine circuit 12, a memory I/F circuit 413, a CRT controller circuit 14, a RAMDAC circuit 15, a DRAM 16, and an SRAM 17.

Here, the DDA set-up circuit 10, the texture engine circuit 12, the CRT controller circuit 14, the RAMDAC circuit 15, the DRAM 16, and the SRAM 17 are the same as those explained in the first embodiment.

Below, the triangle DDA circuit 411 and the memory I/F circuit 413 will be explained.

Triangle DDA Circuit 411

The triangle DDA circuit 411 uses the variational data S10 input from the DDA set-up circuit 10 in the same way as in the above first embodiment to calculate the linearly interpolated (z, R, G, B, α, s, t, q) data of the pixels inside the triangle.

The triangle DDA circuit 411 outputs the (x, y) data of the pixels and the (z, R, G, B, α, s, t, q, val) data for the pixels at the (x, y) coordinates as DDA data (interpolation data) S11 to the texture engine circuit 12.

In the second embodiment, the triangle DDA circuit 411 outputs units of 8 pixels' worth of DDA data S11 of pixels positioned inside the block to be processed in parallel to the texture engine circuit 12.

Note that among the data (z, R, G, B, α, s, t, q, val) of the 8 pixels to be processed in parallel, the val data is referred to as val data S220$_1$ to S220$_8$ and the (z, R, G, B, α, s, t, q) data is referred to as operation data S221$_1$ to S221$_8$.

Namely, the triangle DDA circuit 11 outputs the 8 pixels' worth of DDA data S11 composed of the (x, y) data, the val data S220$_1$ to S220$_8$, and the operation data S221$_1$ to S221$_8$ to the texture engine circuit 12.

The triangle DDA circuit 411 judges whether or not the a data in the (z, R, G, B, α, s, t, q) data generated by linear interpolation as explained above is "0" for the 8 pixels being processed in parallel, that is, judges whether or not to perform the a blending.

Then, the triangle DDA circuit 411 outputs the val data S411$a_1$ to S411$a_8$ indicating "0" (not to perform the a blending) to the memory I/F circuit 413 when the a data is judged to be "0", while outputs the val data S411$a_1$ to S411$a_8$ indicating "1" (to perform the α blending) to the memory I/F circuit 413 when the a data is judged to be not "0".

Memory I/F Circuit 413

FIG. 6 is a view of the configuration of the texture engine circuit 12 and the memory I/F circuit 413.

As shown in FIG. 6, the memory I/F circuit 413 comprises the operation block 204 and the operation block 405.

Note that components in FIG. 6 given the same reference numerals as those in FIG. 3 are the same as the components given the same reference numerals explained in the first embodiment.

Namely, the texture engine circuit 12 is the same as that explained in the first embodiment, and the operation block 204 of the memory I/F circuit 413 is the same as that explained in the first embodiment.

Below, the operation block 405 of the memory I/F circuit 413 will be explained.

[Operation Block 405]

The operation block 405 has operation sub-blocks 405$_1$ to 405$_8$, blends the (R, G, B, α) data S204$_1$ to S204$_8$ input from the operation sub-blocks 204$_1$ to 204$_8$ and the (R, G, B) data already stored in the display buffer 21 by the blending ratio indicated by the α data included in the respective (R, G, B, α) data S204$_1$ to S204$_8$, and writes the blended (R, G, B) data S405$_1$ to S405$_8$ to the display buffer 21.

At this time, the operation sub-blocks 405$_1$ to 405$_8$ detect the levels of the val data S220$_1$ to S220$_8$ respectively from the operation block 204 and the val data S411$a_1$ to S411$a_8$ from the triangle DDA circuit 411 shown in FIG. 5 and perform the a blending only when both of the levels are "1".

Here, the case where both of the levels are "1" means that the pixel is inside the triangle being processed and the α data of the pixel is not "0" (indicating to perform the α blending).

Namely, the operation sub-block 405$_1$ to 405$_8$ do not perform the a blending when either of the val data S220$_1$ to S220$_8$ or the val data S411$a_1$ to S411$a_8$ is "0".

Note that the operation sub-blocks 405$_1$ to 405$_8$ write the (R, G, B, α) data S204$_1$ to S204$_8$ input from the operation sub-blocks 204$_1$ to 204$_8$ to the display buffer 21 when the level of the val data S220$_1$ to S220$_8$ is "1" and the level of the val data S411$a_1$, to S411$a_8$ is "0".

Below, the operation of the three-dimensional computer graphic system 451 will be explained.

The overall operation of the three-dimensional computer graphic system 451 is basically the same as that of the overall operation of the three-dimensional computer graphic system 1 explained in the above first embodiment.

Also, the operation of the pipeline processing of the texture engine circuit 12 and the memory I/F circuit 413 shown in FIG. 6 is the same as the operation explained in the first embodiment in the case of the processing in the operation blocks 200 to 204.

Below, the operation of the operation block 405 will be explained.

The (R, G, B, α) data $S204_1$ to $S204_8$ and the val data $S220_1$ to $S220_8$ are output from the operation sub-blocks $204_1$ to $204_8$ to the operation sub-blocks $405_1$ to $405_8$ shown in FIG. 6.

The triangle DDA circuit 411 shown in FIG. 5 judges whether or not the α data in the (z, R, G, B, α, s, t, q) data generated by linear interpolation is "0" and outputs the val data $S411a_1$ to $S411a_8$ indicating the result of the judgement to the operation sub-blocks $405_1$ to $405_8$ shown in FIG. 6.

In the operation sub-blocks $405_1$ to $405_8$, the clock enablers $415_1$ to $415_8$ detect the levels of the val data $S220_1$ to $S220_8$ and $S411a_1$ to $S411a_8$. Only when both of the levels are "1", is the α blending performed.

In the α blending, the (R, G, B, α) data $S204_1$ to $S204_8$ and the (R, G, B) data already stored in the display buffer 21 are blended by the blending ratio indicated by the a data included in the respective (R, G, B, α) data $S204_1$ to $S204_8$ and the (R, G, B) data $S405_1$ to $S405_8$ is generated. Then, the (R, G, B) data $S405_1$ to $S405_8$ is written in the display buffer 21.

Namely, in the second embodiment, in the operation sub-blocks $405_1$ to $405_8$, the α blending is not performed when either one of the val data $S220_1$ to $S220_8$ or the val data $S411a_1$ to $S411a_8$ is "0".

As explained above, according to the three-dimensional computer graphic system 451, the triangle DDA circuit 411 judges whether the α data is "0" or not for every pixel.

Further, in the memory I/F circuit 413, it is possible not to perform the α blending on pixels with α data of "0", even if pixels inside the triangle being processed, among the 8 pixels to be processed in parallel, based on the above result of judgement by the triangle DDA circuit 411.

Therefore, according to the three-dimensional computer graphic system 451, the power consumption can be further reduced compared with the three-dimensional computer graphic system 1 of the first embodiment.

Third Embodiment

Figure 7:
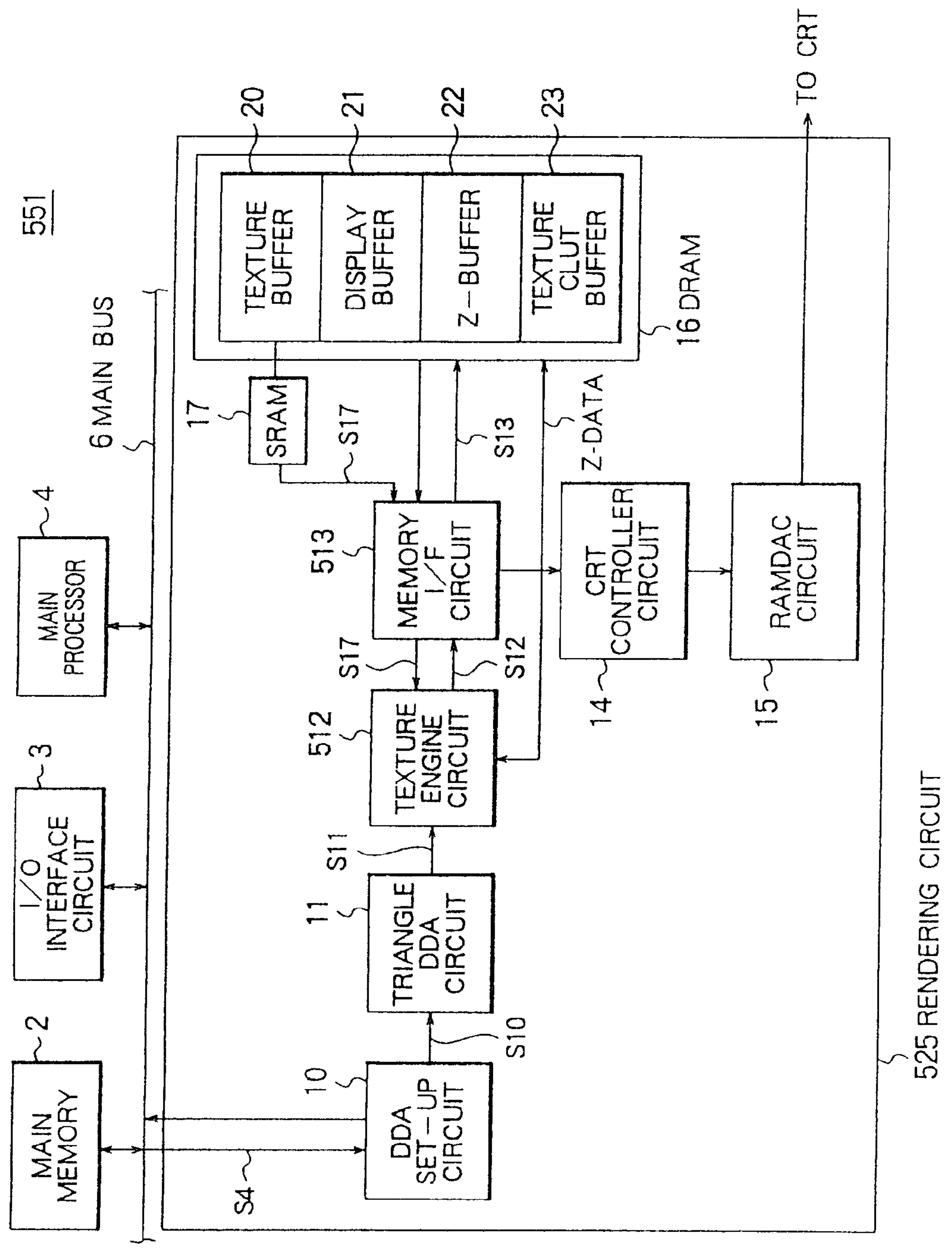
FIG. 7 is a view of the system configuration of a three-dimensional computer graphic system according to a third embodiment of the present invention.

FIG. 7 is a view of the system configuration of a three-dimensional computer graphic system 551 of the third embodiment.

The three-dimensional computer graphic system 551 of the third embodiment, for example, compares the z-data of a pixel to be processed with the corresponding Z-data stored in the z-buffer. When the image being drawn this time is positioned further from the viewing point than the image drawn the previous time, the three-dimensional computer graphic system 551 stops the generation of the texture coordinate data (u, v), the reading of the texture data, the texture a blending, and the a blending.

As shown in FIG. 7, the three-dimensional computer graphic system 551 comprises a main memory 2, an I/O interface circuit 3, a main processor 4, and a rendering circuit 525 connected via a main bus 6.

Components in FIG. 7 given the same reference numerals as in FIG. 1 are the same as the components given the same reference numerals explained in the first embodiment.

Namely, the main memory 2, the I/O interface circuit 3, the main processor 4, and the main bus 6 are the same as those explained in the first embodiment.

Also, as shown in FIG. 7, the rendering circuit 525 comprises a DDA set-up circuit 10, a triangle DDA circuit 11, a texture engine circuit 512, a memory I/F circuit 513, a CRT controller circuit 14, a RAMDAC circuit 15, a DRAM 16, and an SRAM 17.

Here, the DDA set-up circuit 10, the triangle DDA circuit 11, the CRT controller circuit 14, the RAMDAC circuit 15, the DRAM 16, and the SRAM 17 are the same as those explained in the first embodiment.

Below, the texture engine circuit 512 and the memory I/F circuit 513 will be explained.

Figure 8:
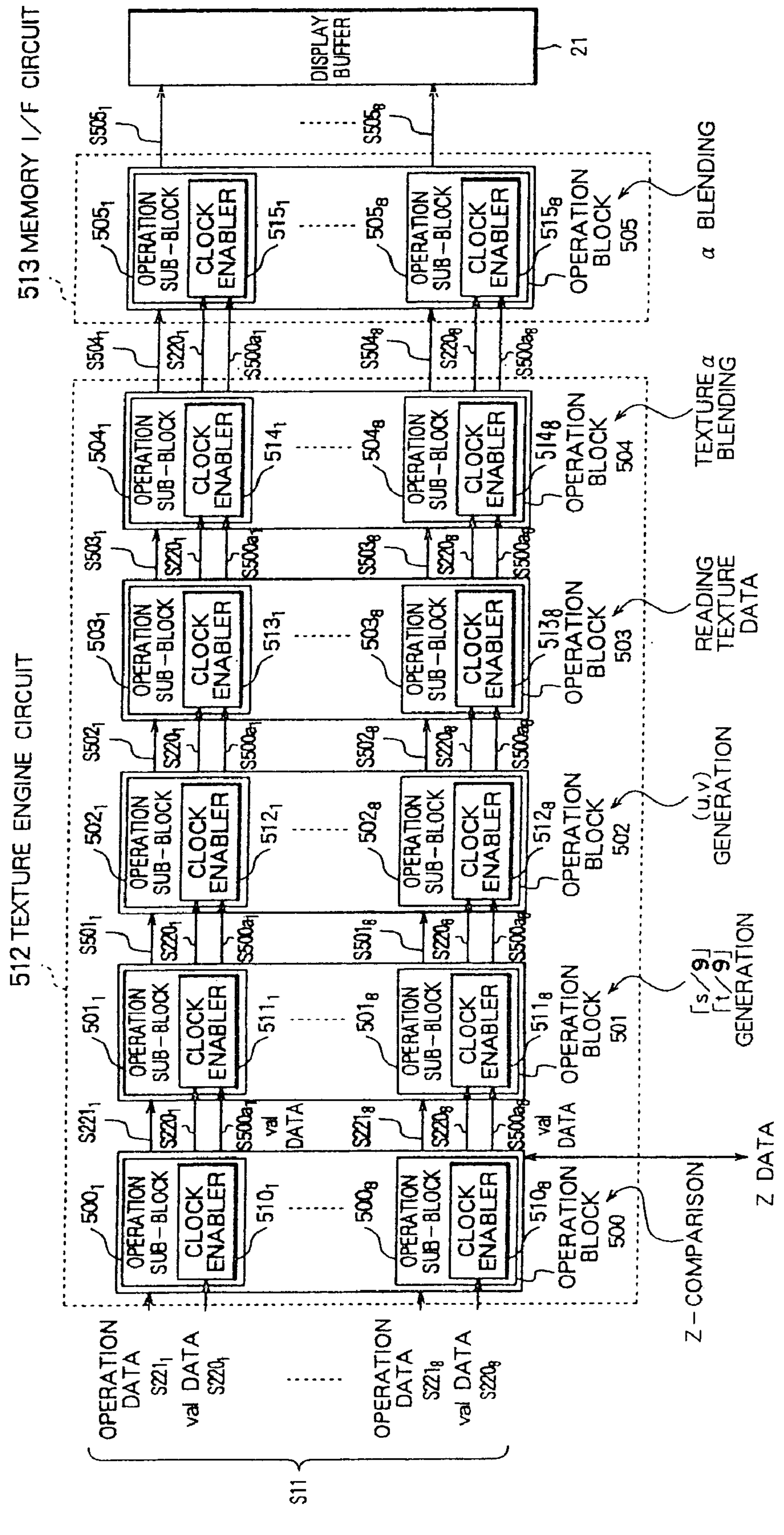
FIG. 8 is a partial view of the configuration of a texture engine circuit and a memory I/F circuit shown in FIG. 7.

FIG. 8 is a view of the configuration of the texture engine circuit 512 and the memory I/F circuit 513.

As shown in FIG. 8, the texture engine circuit 512 comprises operation blocks 500, 501, 502, 503, and 504.

The memory I/F circuit 513 comprises an operation block 505.

In the third embodiment, the operation blocks 500 to 505 are connected in series in order to simultaneously perform the processing on 8 pixels and pipeline processing.

Here, the operation block 500 performs z-comparison, the operation block 501 calculates the "s/q" and "t/q", the operation block 502 calculates the texture coordinate data (u, v), the operation block 503 reads the (R, G, B, α) data from the texture buffer 20, the operation block 504 performs the texture α blending, and the operation block 505 performs the α blending.

[Operation Block 500]

The operation block 500 has operation sub-blocks $501_1$ to $500_8$ and receives as input the DDA data S11 from the triangle DDA circuit 11 shown in FIG. 7.

The operation sub-blocks $501_1$ to $500_8$ detect the levels of the val data $S220_1$ to $S220_8$ included in the DDA data S11 in the respective clock enablers $510_1$ to $510_8$ and perform the z-comparison when the level is "1" (when the pixel is inside a triangle being processed), while do not perform the z-comparison when the level is not "1."

The operation sub-blocks $500_1$ to $500_8$ compare the z-data of the operation data $S221_1$ to $S221_8$ included in the DDA data S11 with the corresponding z-data stored in the z-buffer 22 in the z-comparison.

Then, the operation sub-blocks $500_1$ to $500_8$ output the val data $S500a_1$ to $S500a_8$ indicating "1" to the operation sub-blocks $501_1$ to $501_8$ of the operation block 501 when the image drawn by the operation data $S221_1$ to $S221_8$ is positioned closer to the viewing point than the image drawn in the display buffer 21 the previous time and update the corresponding z-data stored in the z-buffer 22 by the z-data of the operation data $S221_1$ to $S221_8$. At this time, the operation sub-blocks $500_1$ to $500_8$ further output the operation data $S221_1$ to $S221_8$ to the operation sub-blocks $501_1$ to $501_8$.

On the other hand, the operation sub-blocks $500_1$ to $500_8$ output the val data $S500a_1$ to $S500a_8$ indicating "0" to the operation sub-blocks $501_1$ to $501_8$ of the operation block 501 when the image drawn by the operation data $S221_1$ to $S221_8$ is not positioned closer to the viewing point than the image drawn on the display buffer the previous time and do not re-write the corresponding z-data stored in the z-buffer 22.

[Operation Block 501]

The operation block 501 uses the (s, t, q) data indicated by the DDA data S11 to perform the operation of dividing the s data by the q data and the operation of dividing the t data by the q data.

The operation block 501 includes eight operation sub-blocks $501_1$ to $501_8$ as shown in FIG. 8.

Here, the operation sub-block $501_1$ receives as input the operation data $S221_1$ and the val data $S220_1$ and $S500a_1$, judges by the clock enablers $511_1$ to $511_8$ whether or not both of the val data $S220_1$ and $S500a_1$ are "1", that is, the data is valid, and, when it judges both of the val data to be "1", calculates "s/q" and "t/q" and outputs the result of division $S501_1$ to the operation sub-block $502_1$ of the operation block 502.

When either of the val data $S220_1$ or $S500a_1$ is "0", that is, invalid, the operation sub-block $501_1$ does not perform any operation and does not output the result of division $S501_1$ or outputs the result of division $S501_1$ indicating a predetermined provisional value to the operation sub-block 502$_1$ of the operation block 502.

Note that the operation sub-blocks 501$_2$ to 501$_8$ perform the same operation as in the operation sub-block 501$_1$ on the corresponding pixels and output the respective results of division $S501_2$ to $S501_8$ to the operation sub-blocks 502$_2$ to 502$_8$ of the later operation block 502.

[Operation Block 502]

The operation block 502 has operation sub-blocks 502$_1$ to 502$_8$ and multiplies the texture sizes USIZE and VSIZE with the "s/q" and "t/q" indicated by the results of division $S501_1$ to $S501_8$ input from the operation block 501 to generate the texture coordinate data (u, v).

The operation sub-block 502$_1$ detects the levels of the val data $S220_1$ and $S500a_1$ in the clock enabler 512$_1$, performs an operation only when both of the levels are "1", and outputs the texture coordinate data $S502_1$ as the respective calculation results to the operation sub-block 503$_1$ of the operation block 503.

The operation sub-blocks 502$_2$ to 502$_8$ process the corresponding data in the same way as in the operation sub block 502$_1$.

[Operation Block 503]

The operation block 503 has operation sub-blocks 503$_1$ to 503$_8$, outputs a read request including the texture coordinate data (u, v) generated in the operation block 502 to the SRAM 17 or DRAM 16 via the memory I/F circuit 13, and reads the texture data stored in the SRAM 17 or the texture buffer 20 via the memory I/F circuit 513 to obtain the (R, G, B, α) data S17 stored in the texture address corresponding to the (u, v) data.

The operation sub-block 503$_1$ detects the levels of the val data $S220_1$ and $S500a_1$ in the clock enabler 513$_1$ and, only when both of the levels are "1", carries out the read operation and outputs the read (R, G, B, α) data S17 as (R, G, B, α) data $S503_1$ to the operation sub-block 504$_1$ of the operation block 504.

The operation sub-blocks 503$_2$ to 503$_8$ process the corresponding data in the same way as in the operation sub-block 503$_1$.

[Operation Block 504]

The operation block 504 has operation sub-blocks 504$_1$ to 504$_8$ and blends the texture data (R, G, B, α) $S503_1$ to $S503_8$ input from the operation block 503 and the (R, G, B) data included in the corresponding DDA data S11 from the triangle DDA circuit 11 by the blending ratio indicated by the α data (texture α) included in the (R, G, B, α) data $S503_1$ to $S503_8$ to generate the (R, G, B) blend data.

The operation block 504 outputs the generated (R, G, B) blend data and the (R, G, B, α) data $S504_1$ to $S504_8$ including the α data included in the corresponding DDA data S11 to the operation block 505.

The operation sub-blocks 504$_1$ to 504$_8$ detect the levels of the val data $S220_1$ to $S220_8$ and $S500a_1$ to $S500a_8$ respectively by the clock enablers 514$_1$ to 514$_8$ and perform the above blending only when both of the levels are "1".

[Operation Block 505]

The operation block 505 has operation sub-blocks 505$_1$ to 505$_8$, blends the input (R, G, B, α) data $S504_1$ to $S504_8$ and the (R, G, B) data already stored in the display buffer 21 by the blending ratio indicated by the a data included in the respective (R, G, B, α) data $S504_1$ to $S504_8$, and writes the (R, G, B) blended data $S505_1$ to $S505_8$ to the display buffer 21.

The operation sub-blocks 505$_1$ to 505$_8$ detect the levels of the val data $S220_1$ to $S220_8$ and $S500a_1$ to $S500a_8$ in the respective clock enablers and, only when both of the levels are "1", perform the above blending and the writing to the display buffer 21

Below, the operation of the pipeline processing of the texture engine circuit 512 and the memory I/F circuit 513 shown in FIG. 8 will be explained.

First, the clock enablers 510$_1$ to 510$_8$ of the operation sub-blocks 500$_1$ to 500$_8$ detect the levels of the val data $S220_1$ to $S220_8$ included in the DDA data S11. When the detected level is "1" (when the pixel is inside the triangle being processed), the z-comparison is performed.

Then, when the image to be drawn by the operation data $S221_1$ to $S221_8$ is positioned closer to the viewing point than the image drawn in the display buffer the previous time, the val data $S500a_1$ to $S500a_8$ respectively indicating "1" are output to the operation sub-blocks 501$_1$ to 501$_8$ of the operation block 501 and the corresponding z-data stored in the z-buffer 22 is updated by the z-data of the respective operation data $S221_1$ to $S221_8$. At this time, the operation data $S221_1$ to $S221_8$ are output from the operation sub-blocks 500$_1$ to 500$_8$ to the operation sub-blocks 501$_1$ to 501$_8$.

On the other hand, when the levels of the val data $S220_1$ to $S220_8$ are not "1", the z-comparison is not performed and the val data $S500a_1$ to $S500a_8$ indicating "0" are output to the operation sub-blocks 501$_1$ to 501$_8$ of the operation block 501. At this time, the corresponding z-data stored in the z-buffer 22 is not updated.

Next, it is judged in the clock enablers 511$_1$ to 511$_8$ of the operation sub-blocks 501$_1$ to 501$_8$ if both the val data $S220_1$ and $S500a_1$ are "1", that is, valid. When it is judged that both are "1", "s/q" and "t/q" are calculated and output as results of division $S501_1$ to $S501_8$ to the operation sub-blocks 502$_1$ to 502$_8$ of the operation block 502.

On the other hand, when any of the val data $S220_1$ to $S220_8$ or $S500a_1$ to $S500a_8$ is judged to be "0", that is, invalid, no operation is performed in the operation sub-blocks 501$_1$ to 501$_8$.

Next, in the clock enablers 512$_1$ to 512$_8$ of the operation sub-blocks 502$_1$ to 502$_8$ the levels of the val data $S220_1$ to $S220_8$ and $S500a_1$ to $S500a_8$ are detected.

Only when both of the levels are "1", the operation sub-blocks 502$_1$ to 502$_8$ multiply the respective texture sizes USIZE and VSIZE with the "s/q" and "t/q" indicated by the results of division $S501_1$ to $S501_8$ input from the operation block 501 to generate the texture coordinate data (u, v). The texture coordinate data (u, v) is output respectively to the operation sub-blocks 503$_1$ to 503$_8$.

Next, in the clock enablers 513$_1$ to 513$_8$ of the operation sub-blocks 503$_1$ to 503$_8$, the levels of the val data $S220_1$ to $S220_8$ and $S500a_1$ to $S500a_8$ are detected. Only when both of the levels are "1", a read request including the texture coordinate data (u, v) is output to the SRAM 17, the texture data is read via the memory I/F circuit 13, and the (R, G, B, α) data S17 stored in the texture address corresponding to the (u, v) data is obtained. The (R, G, B, α) data S17 is output as the (R, G, B, α) data $S503_1$ to $S503_8$ to the operation sub-blocks 504$_1$ to 504$_8$.

Next, the clock enablers 514$_1$ to 514$_8$ of the operation sub-blocks 504$_1$ to 504$_8$ detect the levels of the val data $S220_1$ to $S220_8$ and $S500a_1$ to $S500a_8$. Then, only when both of the levels are "1", the (R, G, B, α) data $S503_1$ to $S503_8$ and the (R, G, B) data included in the corresponding DDA data S11 from the triangle DDA circuit 11 are blended by the blending ratio indicated by the a data included in the (R, G, B, α) data $S503_1$ to $S503_8$ to generate the (R, G, B) blend data.

Then, the generated (R, G, B) blend data and the (R, G, B, α) data $S504_1$ to $S504_8$ including the a data included in the corresponding DDA data S11 are output from the operation sub-blocks $504_1$ to $504_8$ to the operation sub-blocks $505_1$ to $505_8$.

Next, in the clock enablers $515_1$ to $515_8$ of the operation sub-blocks $505_1$ to $505_8$, the levels of the val data $S220_1$ to $S220_8$ and $S500a_1$ to $S500a_8$ are detected. Only when both of the levels are "1," the (R, G, B, α) data $S504_1$ to $S504_8$ and the (R, G, B) data already stored in the display buffer 21 are blended by the blending ratio indicated by the α data included in the respective (R, G, B, α) data $S504_1$ to $S504_8$. The blended (R, G, B) data $S505_1$ to $S505_8$ are written in the display buffer 21.

As explained above, according to the three-dimensional computer graphic system 551, the first operation block 500 of the texture engine circuit 512 performs the z-comparison on the respective pixels and judges if the image data to be generated in the latter processing should be written in the display buffer 21 or not.

Then, in the texture engine circuit 512 and memory I/F circuit 513, even a pixel inside the triangle being processed among the 8 pixels to be processed in parallel is, based on the above results of the judgement by the operation block 500, made to be not processed (stopped) as image data not to be written in the display buffer 21.

Therefore, according to the three-dimensional computer graphic system 551, the power consumption can be further reduced compared with the above three-dimensional computer graphic system 1 of the first embodiment.

The present invention is not limited to the above embodiments.

Figure 9:
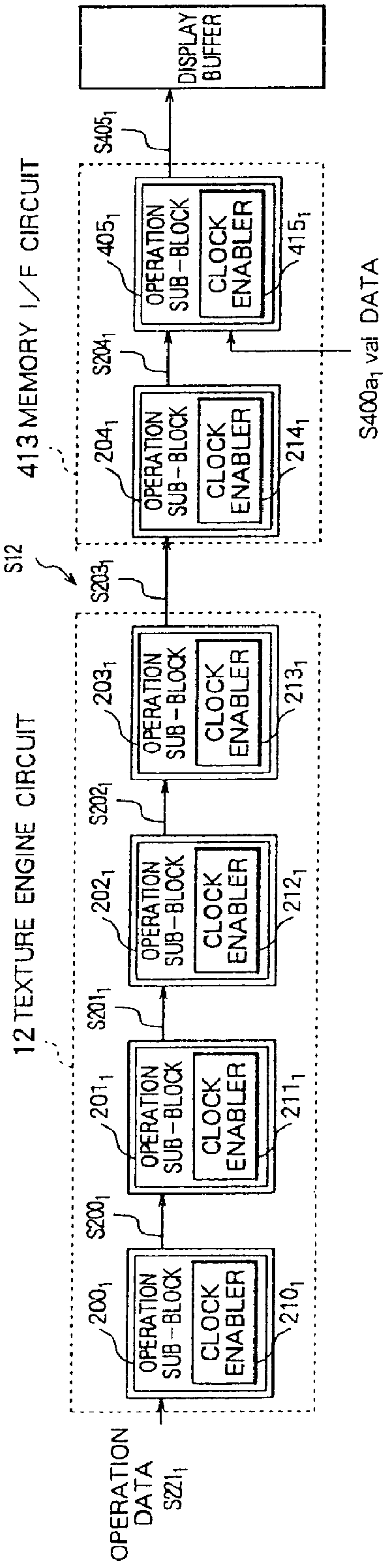
FIG. 9 is a view of the configuration of a modification of the three-dimensional computer graphic system shown in FIG. 5.

For example, in the above second embodiment, as shown in FIG. 6, an example was given of the case where 8 pixels of data were simultaneously processed in the operation blocks of the texture engine circuit 12 and the memory I/F circuit 413. However, as shown in FIG. 9, 1 pixel of data may be processed in the operation blocks as well.

In this case, since only the operation data $S221_1$ of the pixel to be processed is input to the texture engine circuit 12, the val data $S220_1$ becomes unnecessary. Namely, operations are always performed in the operation sub-blocks $200_1$, $201_1$, $202_1$, $203_1$, and $204_1$. In the operation sub-block $405_1$, the a blending is performed only when the level of the val data $S400a_1$ is "1".

Figure 10:
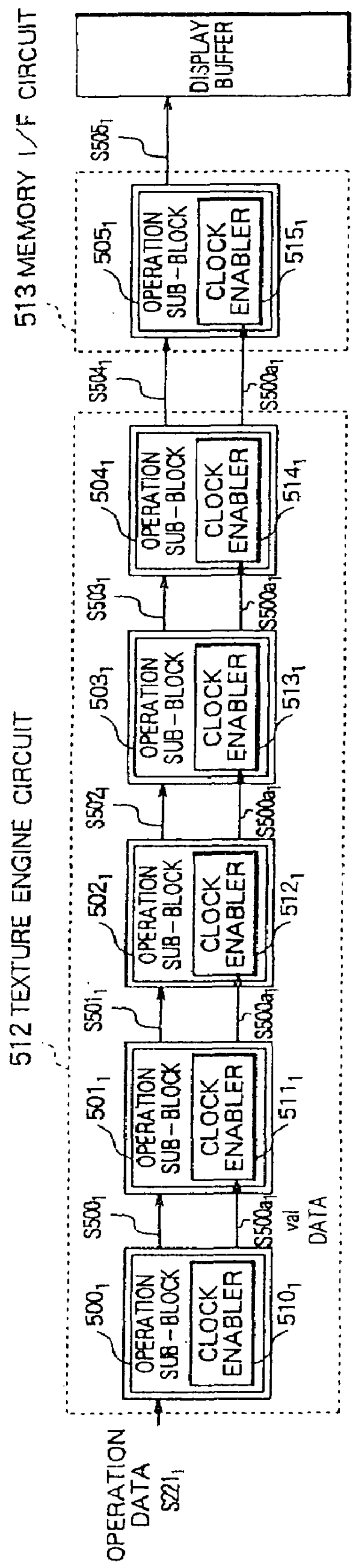
FIG. 10 is a view of the configuration of a modification of the three-dimensional computer graphic system shown in FIG. 7.

Also, in the above third embodiment, as shown in FIG. 8, an example was given of the case where 8 pixels of data were simultaneously processed in the operation blocks of the texture engine circuit 512 and the memory I/F circuit 513. However, as shown in FIG. 10, 1 pixel of data may also be processed in the operation blocks.

In this case, since only the operation data $S221_1$ of the pixel to be processed is input to the texture engine circuit 512, the val data $S220_1$ becomes unnecessary. Namely, the z-comparison is always performed in the operation sub-block $500_1$. In the operation sub-blocks $501_1$, $502_1$, $503_1$, $504_1$, and $505_1$, the processing is performed only when the level of the val data $S500a_1$ generated in the operation sub-block $500_1$ is "1".

Figure 11:
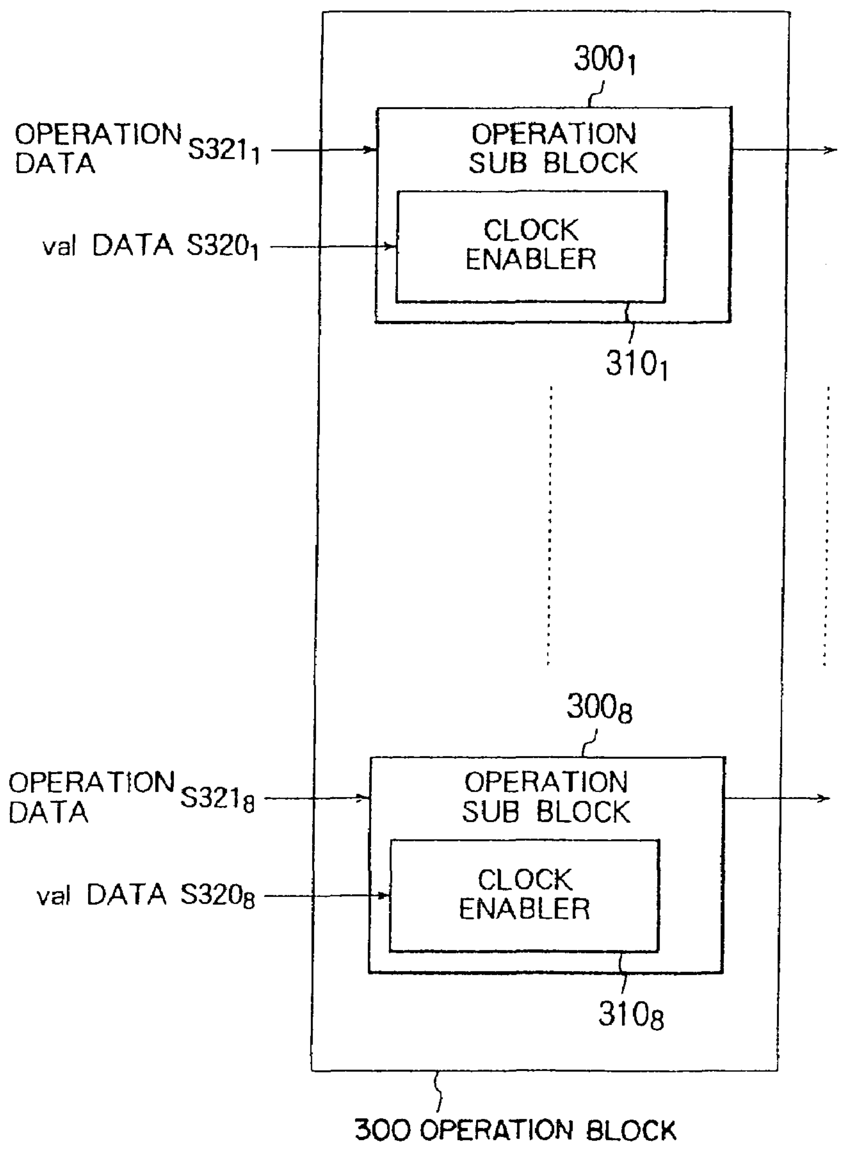
FIG. 11 is a view of the configuration of an operation block wherein a clock-enabler in the three-dimensional computer graphic system shown in FIG. 1 is applied and pipeline processing is not performed.

Also, in the above embodiments, as shown in FIG. 3, an example was given of the case where the val data $S220_1$ to $S220_8$ are used for the operation sub-blocks to perform the pipeline processing in the texture engine circuit 12 and memory I/F circuit 13. However, for example, whether or not to perform the operation may be determined by using the val data $S320_1$ to $S320_8$ as shown in FIG. 11 on a predetermined processing without pipeline processing among the processing in the DDA set-up-circuit 10, the triangle DDA circuit 11, the texture engine circuit 12, and the memory I/F circuit 13 in the rendering circuit 5 shown in FIG. 1.

Also, in the above embodiments, a configuration using the SRAM 17 was given as an example, however, it may be configured without the SRAM 17.

The texture buffer 20 and the texture CLUT buffer 23 may be provided outside the DRAM 16.

Also, in the above embodiments, a case of displaying a three-dimensional image was given as an example, however, the present invention can be applied to a case of displaying a two-dimensional image by simultaneously processing the data of a plurality of pixels.

Also, in the above embodiments, as shown in FIG. 2, an example was given of using the DDA data S11 in which the val data was added as valid instruction data to the data (z, R, G, B, α, s, t, q) to be image processed. However, the (z, R, G, B, α, s, t, q) data and the val data may be handled as separate independent data.

Also, in the above embodiments, an example was given of the case where the geometric processing for generating polygon rendering data was performed in the main processor 4, however, it can be performed in the rendering circuit 5 as well.

Furthermore, in the above embodiments, a triangle was given as an example of the unit graphic, however, the shape of the unit graphic is not limited. For example, it may also be a rectangle.

Summarizing the effects of the invention, as explained above, according to the image processing apparatus and method of the present invention, the power consumption can be reduced by a large extent.

Therefore, according to the image processing apparatus and method of the present invention, a power source having a small and simple configuration can be used and the apparatus can be made smaller in size.

While the invention has been described with reference to the specific embodiment chosen for purpose of illustration, it should be apparent that numerous modifications could be made thereto by those skilled in the art without departing from the basic concept and scope of the invention.

What is claimed is:

1. An image processing apparatus comprising:

a plurality of pixel processing circuits, each provided for processing each of a plurality of pixel data to be processed simultaneously, for processing a plurality of input pixel data in parallel; and a control circuit for stopping the operation of at least one of said pixel processing circuits when the processing of said pixel data to be processed in the pixel processing circuit is not needed.

2. An image processing apparatus as set forth in claim 1, wherein:

said pixel processing circuits operate on the basis of a clock signal; and said control circuit supplies said pixel processing circuits with said clock signal when judging the pixel processing is needed and stops the supply of said clock signal to said at least one of said pixel processing circuits when judging the pixel processing is not needed.

3. An image processing apparatus as set forth in claim 2, wherein each of said pixel processing circuits comprises a plurality of processing circuits connected in series to form a pipeline circuit.

4. An image processing apparatus as set forth in claim 3, wherein each of said plurality of processing circuits connected in series within said pixel processing circuit has a flag storage portion, said flag storage portions of said plurality of processing circuits are connected in series to constitute a shift register, and said shift register is used to control pipeline processing within the pixel processing circuit and the supply of said clock signal.

5. An image processing apparatus as set forth in claim 1, wherein each of said pixel processing circuits performs processing with respect to pixel data of red (R), green (G), and blue (B) of a pixel.

6. An image processing apparatus for expressing an image to be displayed on a display means by a composite of graphic units of a predetermined shape, processing pixel data of a plurality of pixels positioned within each graphic unit on the basis of the same processing conditions, and using as valid data the results of the processing of the pixel data of the pixels positioned within said graphic unit to be processed among pixel data of a plurality of pixels to be processed simultaneously, said image processing apparatus comprising:

a pixel position judging circuit for judging whether or not a corresponding pixel is positioned within said graphic unit for each of the plurality of pixel data to be processed simultaneously;

a plurality of pixel processing circuits for processing a plurality of pixel data to be processed simultaneously mutually in parallel; and a control circuit for stopping the operation of the pixel processing circuits other than processing circuits for processing pixel data of pixels positioned within the graphic unit to be processed among said plurality of pixel processing circuits on the basis of the results of the judgement of said pixel position judging circuit.

7. An image processing apparatus as set forth in claim 6, wherein:

each of said pixel processing circuits operates on the basis of a clock signal; and said control circuit supplies said clock signal to pixel processing circuits processing the pixel data of pixels positioned inside the graphic unit to be processed, and stops the supply of said clock signal to pixel processing circuits processing the pixel data of pixels not positioned inside the graphic unit to be processed.

8. An image processing apparatus as set forth in claim 7, wherein each of said pixel processing circuits comprises a plurality of processing circuits connected in series so as to perform pipeline processing.

9. An image processing apparatus as set forth in claim 8, wherein each of said plurality of processing circuits connected in series within each said pixel processing circuit has a flag storage portion, said flag storage portions of said plurality of processing circuits are connected in series to constitute a shift register, and said shift register is used to control said pipeline processing and the supply of said clock signal.

10. An image processing apparatus as set forth in claim 6, wherein:

said pixel position judging circuit adds validity data indicating the result of the judgement to pixel data processed by said pixel processing circuits; and said control circuit judges based on the validity data whether to stop the operation of said pixel processing circuits.

11. An image processing apparatus comprising:

a plurality of pixel processing circuits, provided for a plurality of pixels to be processed simultaneously, for blending a plurality of first pixel data and a corresponding plurality of second pixel data by blending ratios indicated by a blending ratio data set for each pixel to produce a plurality of third pixel data; and a control circuit for judging whether or not said pixel processing circuits will perform said blending and stopping the operation of said pixel processing circuits when judging that said blending will not be performed.

12. An image processing apparatus as set forth in claim 11, wherein:

each of said pixel processing circuits operates on the basis of a clock signal; and said control circuit supplies each respective pixel processing circuit with said clock signal when judging that said pixel processing circuit will perform blending and stops the supply of said clock signal to said pixel processing circuit when judging that it will not perform said blending.

13. An image processing apparatus as set forth in claim 12, wherein each of said pixel processing circuits comprises a plurality of processing circuits connected in series so as to perform pipeline processing.

14. An image processing apparatus as set forth in claim 13, wherein each of said plurality of processing circuits connected in series within each said pixel processing circuit has a flag storage portion, said flag storage portions of said plurality of processing circuits are connected in series to constitute a shift register, and said shift register is used to control said pipeline processing and the supply of said clock signal.

15. An image processing apparatus as set forth in claim 11, further comprising a storage circuit for storing said second pixel data, wherein said control circuit rewrites the second pixel data stored in said storage circuit by said first pixel data when judging that blending will not be performed and rewrites the second pixel data stored in the storage circuit by said third pixel data when judging that blending will be performed.

16. An image processing apparatus for expressing an image to be displayed on a display means by a composite of graphic units of a predetermined shape, processing pixel data of a plurality of pixels positioned within each graphic unit on the basis of the same processing conditions, and using as valid data the results of the processing of the pixel data of the pixels positioned within said graphic unit to be processed among pixel data of a plurality of pixels to be processed simultaneously, said image processing apparatus comprising:

a plurality of image processing circuits, provided for a plurality of pixels to be processed simultaneously, for blending a plurality of first pixel data and a corresponding plurality of second pixel data by a blending ratio indicated by a blending ratio data set for each pixel to produce a plurality of third pixel data; and a control circuit for judging whether or not a corresponding pixel is positioned within said graphic unit to be processed for each of said plurality of pixels to be processed simultaneously and stopping the operation of a pixel processing circuit when judging that said corresponding pixel is not positioned within said graphic unit or when judging that said blending will not be performed on the basis of said blending ratio data.

17. An image processing apparatus comprising:

a storage circuit;

a plurality of pixel processing circuits, provided for a plurality of pixels to be processed simultaneously, for producing a plurality of second pixel data from a plurality of first pixel data;

a comparing circuit for comparing a plurality of first depth data of said plurality of first pixel data and a plurality of second depth data of a plurality of third pixel data stored in said storage circuit in correspondence with said plurality of first depth data; and a control circuit for judging whether or not to rewrite third pixel data corresponding to second depth data stored in said storage circuit by second pixel data and stopping the operation of the corresponding pixel processing circuit when judging not to rewrite.

18. An image processing apparatus as set forth in claim 17, wherein:

said pixel processing circuit operates on the basis of a clock signal; and said control circuit supplies said pixel processing circuit with said clock signal when judging to rewrite the third pixel data stored in the storage circuit with the second pixel data and stopping the supply of said clock signal to the pixel processing circuit when judging not to rewrite the third pixel data stored in the storage circuit by the second pixel data.

19. An image processing apparatus as set forth in claim 18, wherein each of said pixel processing circuits comprises a plurality of processing circuits connected in series so as to perform pipeline processing.

20. An image processing apparatus as set forth in claim 19, wherein each of said plurality of processing circuits connected in series within said pixel processing circuit has a flag storage portion, said flag storage portions of said plurality of processing circuits are connected in series to constitute a shift register, and said shift register is used to control said pipeline processing and the supply of said clock signal.

21. An image processing apparatus for expressing an image to be displayed on a display means by a composite of graphic units of a predetermined shape, processing pixel data of a plurality of pixels positioned within each graphic unit on the basis of the same processing conditions, and using as valid data the results of the processing of the pixel data of the pixels positioned within said graphic unit to be processed among pixel data of a plurality of pixels to be processed simultaneously, said image processing apparatus comprising:

a storage circuit;

a plurality of pixel processing circuits, provided for a plurality of pixels to be processed simultaneously, for producing a plurality of second pixel data from a plurality of first pixel data;

a comparing circuit for comparing a plurality of first depth data of said plurality of first pixel data and a plurality of second depth data of a plurality of third pixel data stored in said storage circuit in correspondence with said plurality of first depth data; and a control circuit for judging whether or not a corresponding pixel is positioned within said graphic unit to be processed for each of said plurality of pixels to be processed simultaneously, judging whether or not to rewrite said third pixel data corresponding to said second depth data stored in said storage circuit with said second pixel data on the basis of the result of the comparison, and stopping the operation of at least one of said pixel processing circuits when judging that the corresponding pixel is not positioned within said graphic unit or when judging not to rewrite.

22. An image processing method for performing image processing by using pixel processing circuits, each provided for each of a plurality of pixels to be processed simultaneously, for processing a plurality of input pixel data in parallel, comprising the steps of:

judging whether or not on the basis of said pixel data the pixel processing of said processing circuits is needed; and stopping operation of at least one of said pixel processing circuits when judging the pixel processing of said at least one processing circuit is not needed.

23. An image processing method as set forth in claim 22, further comprising the steps of:

supplying said pixel processing circuit with a clock signal when judging the pixel processing is needed; and stopping the supply of said clock signal to said pixel processing circuit when judging the pixel processing is not needed.

24. An image processing method as set forth in claim 23, wherein each of said pixel processing circuits performs pipeline processing by a plurality of processing circuits connected in series.

25. An image processing method as set forth in claim 24, wherein each of said plurality of processing circuits connected in series within each of said pixel processing circuits has a flag storage portion, said flag storage portions of said plurality of processing circuits are connected in series to constitute a shift register, and said shift register is used to control said pipeline processing and the supply of said clock signal.

26. An image processing method as set forth in claim 22, wherein said pixel processing is processing with respect to pixel data for deciding output of red (R), green (G), and blue (B) of a pixel.

27. An image processing method for expressing an image to be displayed on a display means by a composite of graphic units of a predetermined shape, processing pixel data of a plurality of pixels positioned within each graphic unit on the basis of the same processing conditions, and using as valid data the results of the processing of the pixel data of the pixels positioned within said graphic unit to be processed among pixel data of a plurality of pixels to be processed simultaneously, said image processing method comprising the steps of:

judging whether or not a corresponding pixel is positioned within said graphic unit to be processed for each of the plurality of pixel data to be processed simultaneously;

processing a plurality of pixel data to be processed simultaneously mutually in parallel in a plurality of pixel processing circuits; and stopping the operation of the pixel processing circuits other than processing circuits for processing pixel data of pixels positioned within the graphic unit to be processed among said plurality of pixel processing circuits on the basis of the results of the judgement.

28. An image processing method as set forth in claim 27, further comprising the steps of:

supplying a clock signal to the pixel processing circuits processing the pixel data of pixels positioned inside the graphic unit to be processed; and stopping the supply of said clock signal to pixel processing circuits processing the pixel data of pixels not positioned inside the graphic unit to be processed.

29. An image processing method as set forth in claim 28, wherein each of said pixel processing circuits performs pipeline processing by a plurality of processing circuits connected in series.

30. An image processing method as set forth in claim 29, wherein each of said plurality of processing circuits connected in series within said pixel processing circuit has a flag storage portion, said flag storage portions of said plurality of processing circuits are connected in series to constitute a shift register, and said shift register is used to control said pipeline processing and the supply of said clock signal.

31. An image processing method comprising the steps of:

using a plurality of pixel processing circuits provided for a plurality of pixels to be processed simultaneously to blend a plurality of first pixel data and a plurality of second pixel data by blending ratios indicated by a blending ratio data set for each pixel to produce a plurality of third pixel data;

judging based on said blending ratio data whether to perform said blending by said pixel processing circuits; and stopping the operation of at least one of said pixel processing circuits when judging that said at least one pixel processing circuit will not perform said blending.

32. An image processing method as set forth in claim 31, further comprising the steps of:

supplying a corresponding pixel processing circuit with a clock signal when judging that said corresponding pixel processing circuit will perform blending; and stopping the supply of said clock signal to at least one of said pixel processing circuits when judging that said at least one pixel processing circuit will not perform said blending.

33. An image processing method as set forth in claim 32, wherein each of said pixel processing circuits performs pipeline processing by a plurality of processing circuits connected in series.

34. An image processing method as set forth in claim 33, wherein each of said plurality of processing circuits connected in series within said pixel processing circuit has a flag storage portion, said flag storage portions of said plurality of processing circuits are connected in series to constitute a shift register, and said shift register is used to control said pipeline processing and the supply of said clock signal.

35. An image processing method for expressing an image to be displayed on a display means by a composite of graphic units of a predetermined shape, processing pixel data of a plurality of pixels positioned within each graphic unit on the basis of the same processing conditions, and using as valid data the results of the processing of the pixel data of the pixels positioned within said graphic unit to be processed among pixel data of a plurality of pixels to be processed simultaneously, said image processing method comprising the steps of:

using a plurality of image processing circuits, provided for a plurality of pixels to be processed simultaneously, to blend a plurality of first pixel data and a plurality of second pixel data by a blending ratio indicated by a blending ratio data set for each pixel to produce a plurality of third pixel data;

judging whether or not a corresponding pixel is positioned within a corresponding one of said graphic units for each of said plurality of pixels to be processed simultaneously; and stopping the operation of at least one of said pixel processing circuits when judging that the corresponding pixel is not positioned within said graphic unit to be processed or when judging that said blending will not be performed on the basis of said blending ratio data.

36. An image processing method comprising the steps of:

using a plurality of pixel processing circuits, provided for a plurality of pixels to be processed simultaneously, to produce a plurality of second pixel data from a plurality of first pixel data;

comparing a plurality of first depth data of said plurality of first pixel data and a plurality of second depth data of a plurality of third pixel data stored in a storage circuit in correspondence with said plurality of first depth data; and judging whether or not to rewrite third pixel data corresponding to second depth data stored in said storage circuit by second pixel data and stopping the operation of the corresponding pixel processing circuit when judging not to rewrite.

37. An image processing method as set forth in claim 36, further comprising the steps of:

supplying said pixel processing circuit with a clock signal when judging to rewrite the third pixel data stored in the storage circuit with the second pixel data; and stopping the supply of said clock signal to the pixel processing circuit when judging not to rewrite the third pixel data stored in the storage circuit by the second pixel data.

38. An image processing method as set forth in claim 37, wherein each of said pixel processing circuits performs pipeline processing by a plurality of processing circuits connected in series.

39. An image processing method as set forth in claim 38, wherein each of said plurality of processing circuits connected in series within said pixel processing circuit has a flag storage portion, said flag storage portions of said plurality of processing circuits are connected in series to constitute a shift register, and said shift register is used to control said pipeline processing and the supply of said clock signal.

40. An image processing method for expressing an image to be displayed on a display means by a composite of graphic units of a predetermined shape, processing pixel data of a plurality of pixels positioned within each graphic unit on the basis of the same processing conditions, and using as valid data the results of the processing of the pixel data of the pixels positioned within said graphic unit to be processed among pixel data of a plurality of pixels to be processed simultaneously, said image processing method comprising the steps of:

using a plurality of pixel processing circuits, provided for a plurality of pixels to be processed simultaneously, to produce a plurality of second pixel data from a plurality of first pixel data;

comparing a plurality of said first depth data of said plurality of first pixel data and a plurality of second depth data of a plurality of third pixel data stored in a storage circuit in correspondence with said plurality of first depth data;

judging whether or not a corresponding pixel is positioned within said graphic unit to be processed for each of said plurality of pixels to be processed simultaneously, judging whether or not to rewrite said third pixel data corresponding to said second depth data stored in said storage circuit with said second pixel data on the basis of the result of the comparison; and stopping the operation of at least one of said pixel processing circuits when judging that the corresponding pixel is not positioned within said graphic unit to be processed or when judging not to rewrite.

* * * * *